US012723975B2

(12) United States Patent
Kondo et al.

(10) Patent No.: US 12,723,975 B2
(45) **Date of Patent: *Sep. 1, 2026**

(54) OPTICAL MEASUREMENT DEVICE AND OPTICAL MEASUREMENT METHOD

(71) Applicant: HAMAMATSU PHOTONICS K.K., Hamamatsu (JP)

(72) Inventors: Fusanori Kondo, Hamamatsu (JP); Naoki Iwata, Hamamatsu (JP); Tomokazu Matsumura, Hamamatsu (JP); Teruo Takeshita, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 442 days.

This patent is subject to a terminal disclaimer.

(21) Appl. No.: 17/914,434

(22) PCT Filed: Jan. 21, 2021

(86) PCT No.: PCT/JP2021/002104

§ 371 (c)(1),
(2) Date: Sep. 26, 2022

(87) PCT Pub. No.: WO2021/199605

PCT Pub. Date: Oct. 7, 2021

(65) Prior Publication Data

US 2023/0124819 A1 Apr. 20, 2023

(30) Foreign Application Priority Data

Apr. 1, 2020 (JP) ................................ 2020-066069

(51) Int. Cl.
*G01N 21/27* (2006.01)
*G01N 21/47* (2006.01)

(52) U.S. Cl.
CPC ....... *G01N 21/274* (2013.01); *G01N 21/4738* (2013.01); *G01N 2021/473* (2013.01)

(58) Field of Classification Search
CPC ............ G01N 21/274; G01N 21/6408; G01N 2021/6493
See application file for complete search history.

(56) References Cited

U.S. PATENT DOCUMENTS

| | | |
|---|---|---|
| 5,257,202 A | 10/1993 | Feddersen et al. |
| 5,270,548 A | 12/1993 | Steinkamp |

(Continued)

FOREIGN PATENT DOCUMENTS

| | | |
|---|---|---|
| CN | 102150035 A | 8/2011 |
| CN | 102843951 A | 4/2015 |

(Continued)

OTHER PUBLICATIONS

Paul C Derose, Standard Guide to Fluorescence—Instrument Calibration and Validation NISTIR 7458, NIST, National Institute of Standards and Technology (NIST), Dec. 31, 2007, p. 1-p. 27, XP061055478.

(Continued)

*Primary Examiner* — Jennifer D. Carruth
(74) *Attorney, Agent, or Firm* — FAEGRE DRINKER BIDDLE & REATH LLP

(57) ABSTRACT

In an optical measurement device, in a first process, a reference member is irradiated with excitation light, light for a calibration process including scattered light associated with the excitation light from a reference member is detected as detection light, a calibration signal corresponding to the light for the calibration process is designated as a detection signal, and a calibration process for removing a signal component corresponding to the scattered light from the detection signal in a second process is performed. Also, in the optical measurement device, in the second process, a sample is irradiated with the excitation light, measurement target light including fluorescence generated from the sample and light scattered from the sample irradiated with (Continued)

the excitation light is detected as detection light, and a signal component corresponding to the scattered light from a measurement signal.

7 Claims, 29 Drawing Sheets

(56) References Cited

U.S. PATENT DOCUMENTS

| | | | | |
|---|---|---|---|---|
| 6,384,951 | B1 | 5/2002 | Basiji et al. | |
| 12,146,831 | B2 * | 11/2024 | Iwata | G01N 21/6428 |
| 2001/0023077 | A1 * | 9/2001 | Erb | G01N 21/7703 436/518 |
| 2006/0227319 | A1 * | 10/2006 | Imura | G01N 21/64 356/256 |
| 2008/0314114 | A1 | 12/2008 | Feke et al. | |
| 2009/0230308 | A1 | 9/2009 | Kimura | |
| 2009/0242803 | A1 * | 10/2009 | Imura | G01N 21/645 250/578.1 |
| 2010/0006773 | A1 | 1/2010 | Aasmul | |
| 2010/0032582 | A1 | 2/2010 | Xia et al. | |
| 2018/0100860 | A1 | 4/2018 | Henning | |
| 2023/0124033 | A1 * | 4/2023 | Iwata | G01N 21/6428 250/459.1 |

FOREIGN PATENT DOCUMENTS

| | | | | |
|---|---|---|---|---|
| CN | 105120750 | A | 12/2015 | |
| CN | 105393104 | A | 3/2016 | |
| CN | 104981687 | A | 8/2017 | |
| CN | 108351304 | A | 7/2018 | |
| DE | 19504111 | A1 * | 8/1995 | G06K 7/10594 |
| EP | 2101169 | A2 | 9/2009 | |
| JP | S61-003043 | A | 1/1986 | |
| JP | H04-106470 | A | 4/1992 | |
| JP | H11-051856 | A | 2/1999 | |
| JP | 2001-137173 | A | 5/2001 | |
| JP | 2001-523830 | A | 11/2001 | |
| JP | 2004-157018 | A | 6/2004 | |
| JP | 2010-518394 | A | 5/2010 | |
| JP | 2012-211811 | A | 11/2012 | |
| JP | 2013-200125 | A | 10/2013 | |
| JP | 2018-189946 | A | 11/2018 | |
| JP | 6646742 | B2 | 2/2020 | |
| TW | 201512648 | A | 4/2015 | |
| WO | WO-99/026186 | A1 | 5/1999 | |
| WO | 2006010604 | A1 | 2/2006 | |
| WO | WO-2008/097199 | A1 | 8/2008 | |
| WO | 2016/181076 | A1 | 11/2016 | |
| WO | WO-2017/199510 | A1 | 11/2017 | |
| WO | WO-2020/085452 | A1 | 4/2020 | |

OTHER PUBLICATIONS

International Preliminary Report on Patentability mailed Oct. 13, 2022 for PCT/JP2021/002104.

* cited by examiner

+
-
AMPLITUDE (V)
TIME (t)
SCATTERED LIGHT
FLUORESCENCE
1.5
1
0.5
0
-0.5
-1
-1.5
0
0.2
0.4
0.6
0.8
1
1.2
×(-1)
×(+1)
×(+1)
×(-1)
1
1
2
3
3
4
+
-

(a)
EXCITATION LIGHT INTENSITY ×2
EXCITATION LIGHT INTENSITY ×1
LIGHT INTENSITY/a.u.
CHANNEL/Ch
(b)
EXCITATION LIGHT INTENSITY ×2
EXCITATION LIGHT INTENSITY ×1
LIGHT INTENSITY/a.u.
CHANNEL/Ch
(c)
500
501

Fig.11
(a) POSITIONAL RELATIONSHIP IN INITIAL STATE OF EACH SIGNAL
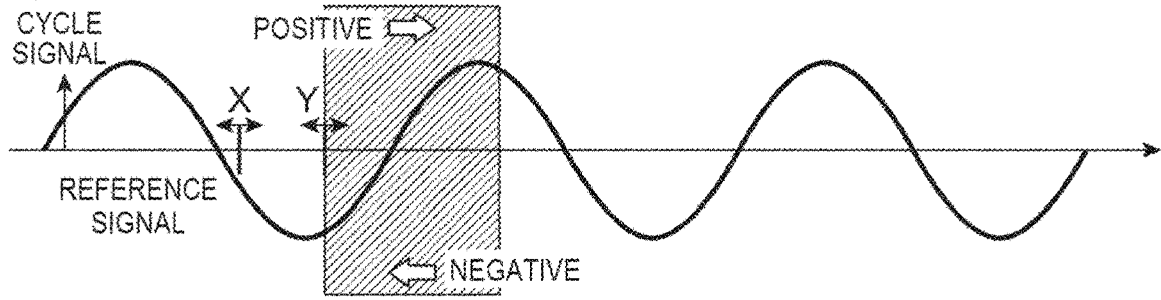
(b) INTEGRAL AND SHIFT TO RIGHT DUE TO POSITIVE VALUE (DIRECTION OF PHASE DELAY)
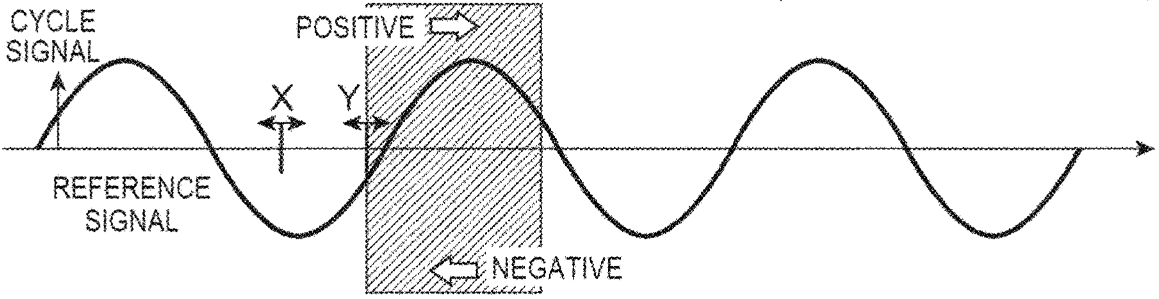
(c) INTEGRAL AND SHIFT TO RIGHT DUE TO POSITIVE VALUE (DIRECTION OF PHASE DELAY)
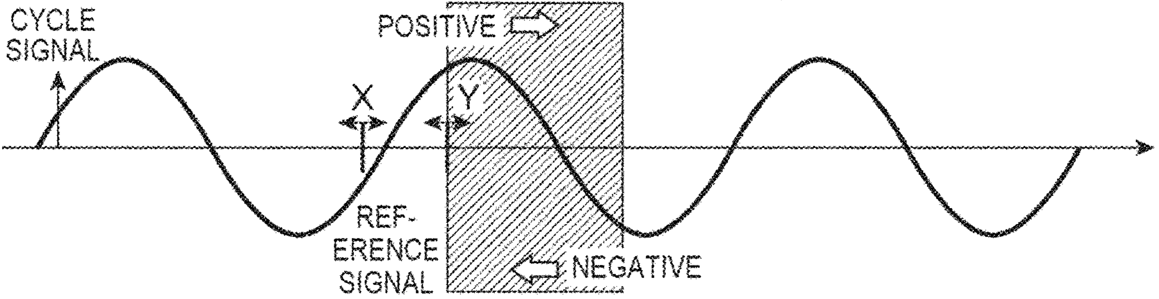
(d) INTEGRAL AND SHIFT TO LEFT DUE TO NEGATIVE VALUE (DIRECTION OF PHASE DELAY)
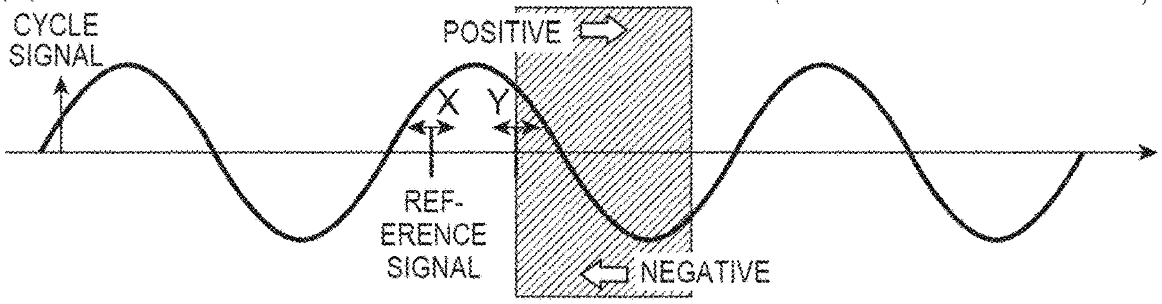
(e) COMPLETION OF CALIBRATION
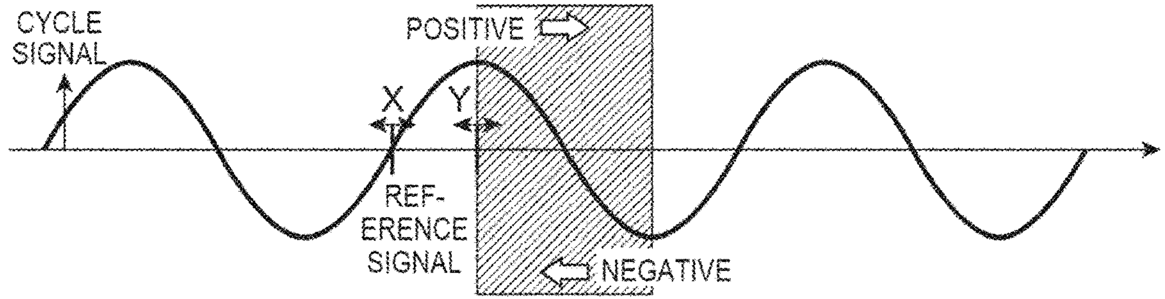

*Fig.12*

| MODULATED FREQUENCY[Hz] | 100 | 500 | 1000 |
|---|---|---|---|
| FLUORESCENCE(Peak to Peak) [mV] | 640 | 270 | 140 |
| EXCITATION LIGHT(Peak to Peak) [mV] | 33 | 27 | 22 |
| FLUORESCENCE/EXCITATION LIGHT | 19 | 10 | 6 |

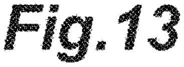

START

SWITCH INPUT FOR ADC TO OFFSET VOLTAGE AND RECORD 0 LEVEL — S11

PERFORM SWITCHING PROCESS OF SWITCH AND INPUT SIGNAL OF LOCK-IN CIRCUIT TO ADC — S12

FORCIBLY SHIFT PHASE TEMPORARILY — S13

RECORD CURRENT VALUE OF ADC — S14

ADC INPUT < 0 LEVEL? — S15

YES

NO

DELAY PHASE OF SWITCH SIGNAL OF LOCK-IN CIRCUIT FOR DOS SIGNAL — S17

ADVANCE PHASE OF SWITCH SIGNAL OF LOCK-IN CIRCUIT FOR DOS SIGNAL — S16

HAS LEVEL BECOME SLASH LEVEL WITHOUT CHANGE IN SIGN OF ADC? — S18

NO

YES

HAS SIGN OF ADC INPUT CHANGED BY SHIFTING PHASE? — S19

NO

YES

SET CHANGE RANGE OF PHASE ACCORDING TO CONTROL TO HALF — S20

END

Fig.14
(a)
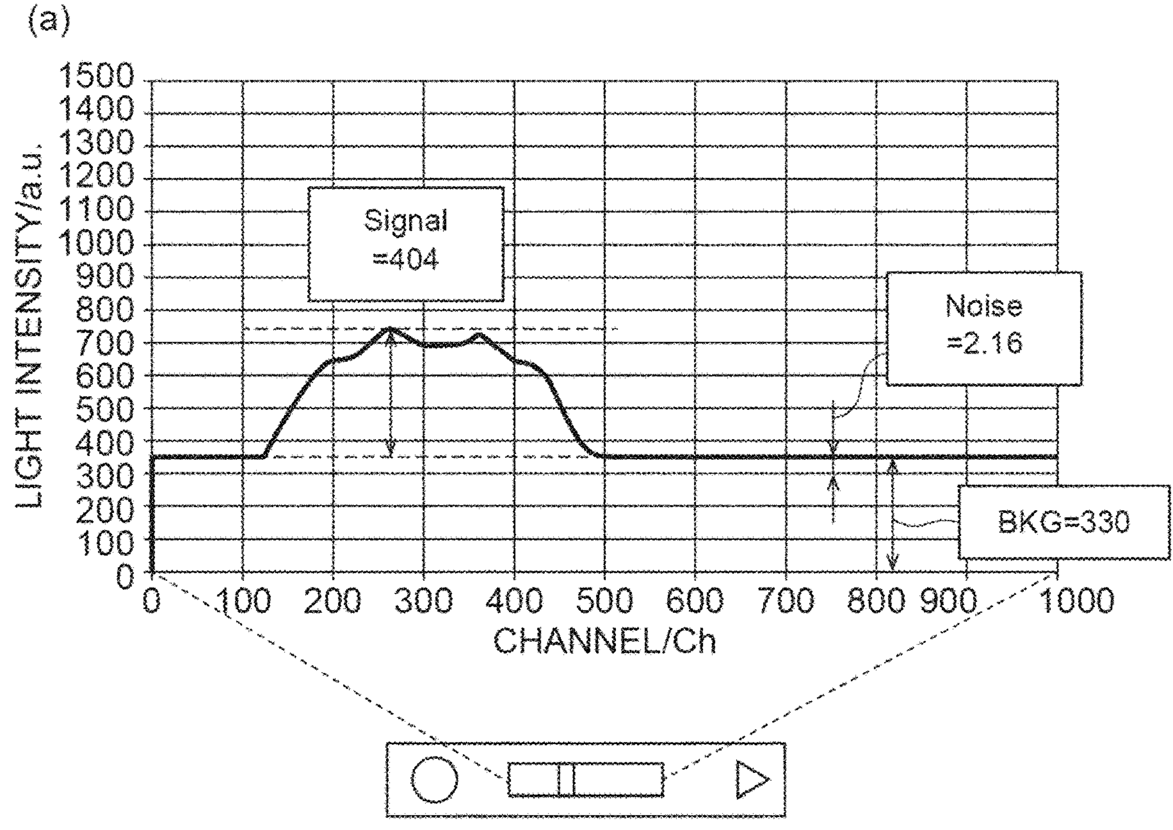
(b)
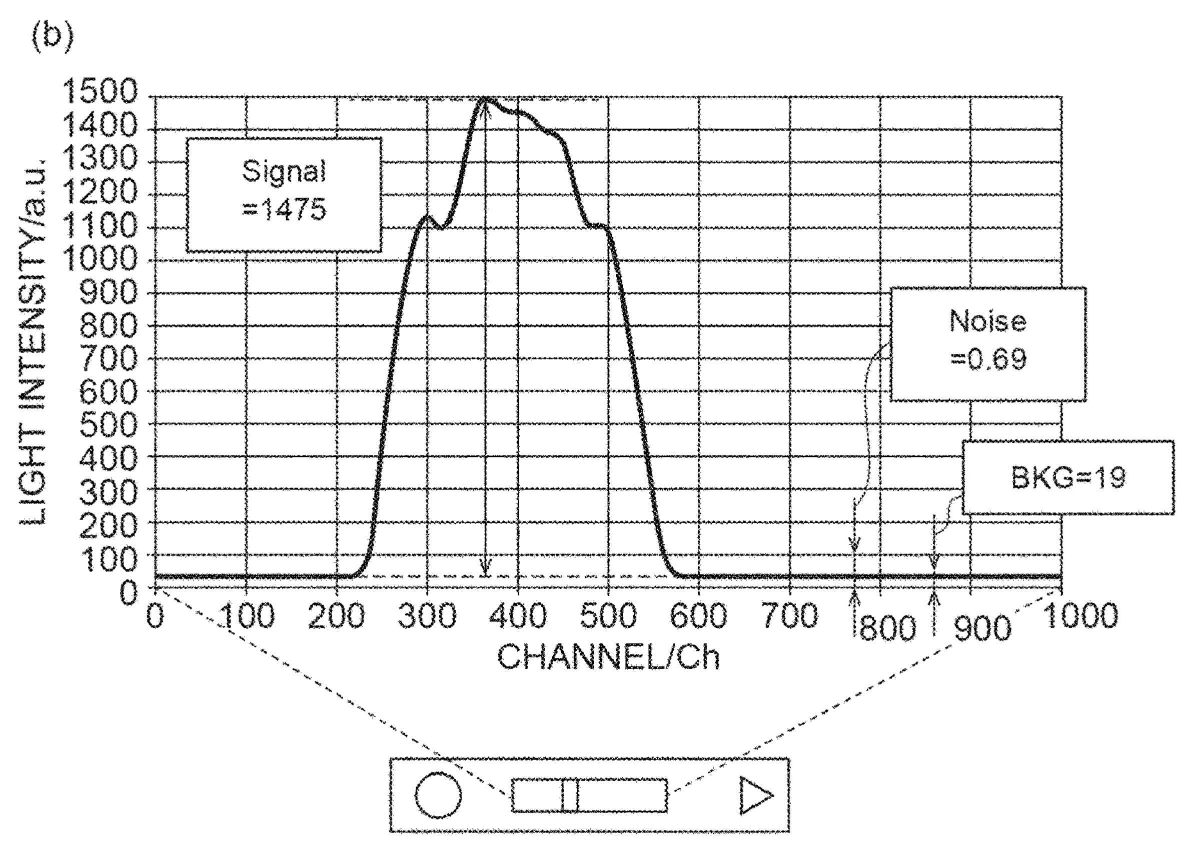

*Fig.15*
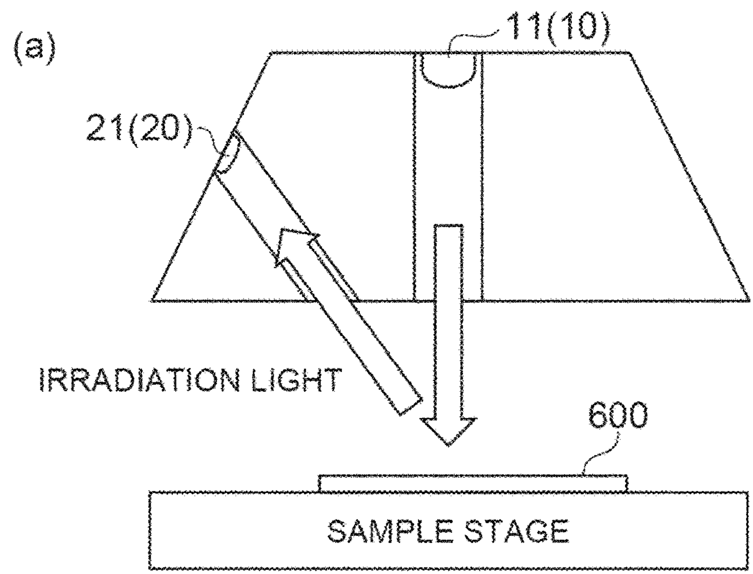
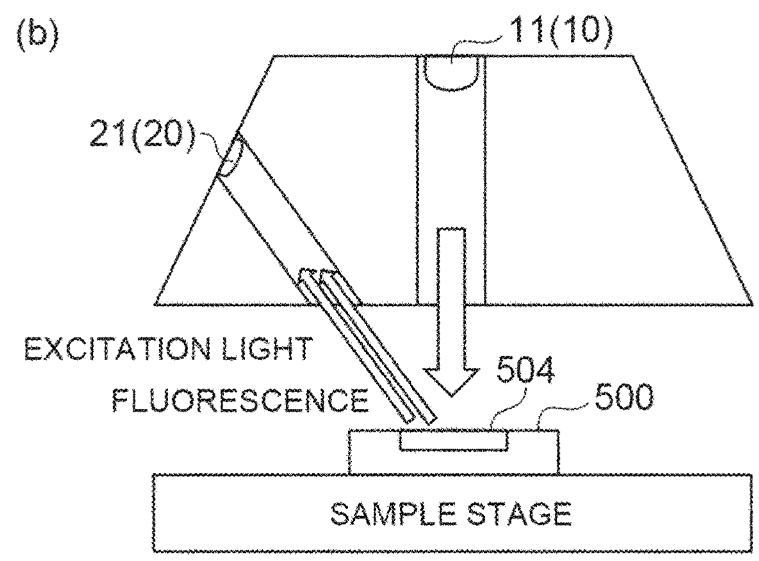
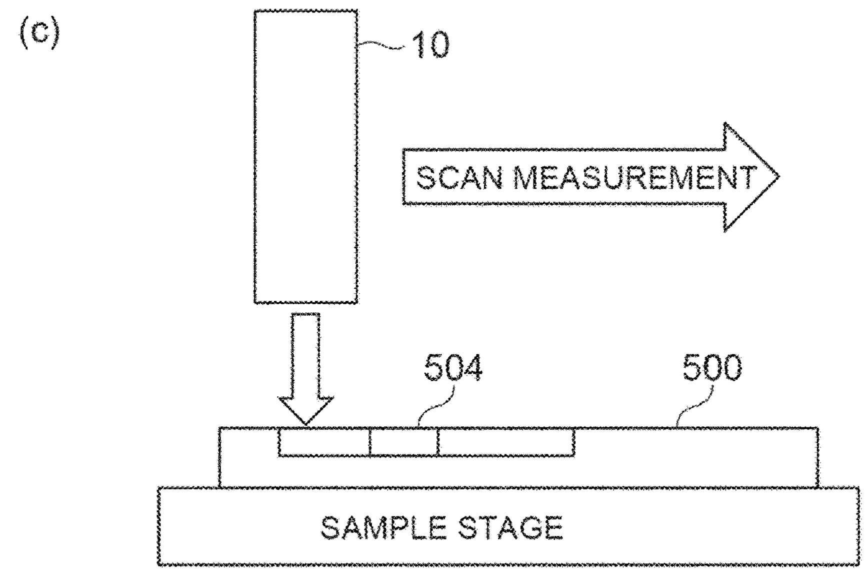

*Fig.16*
(a)
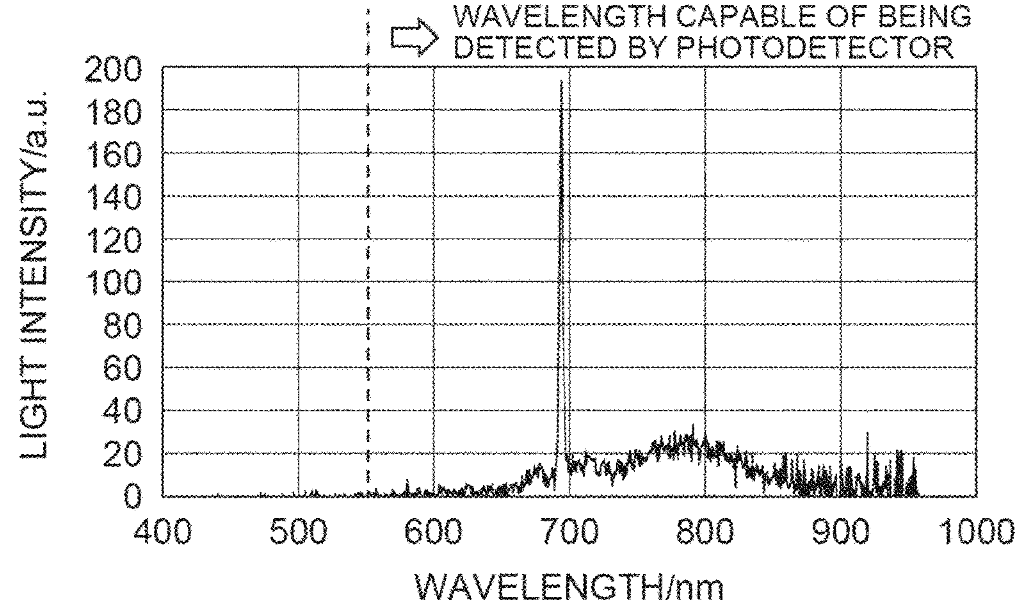
(b)
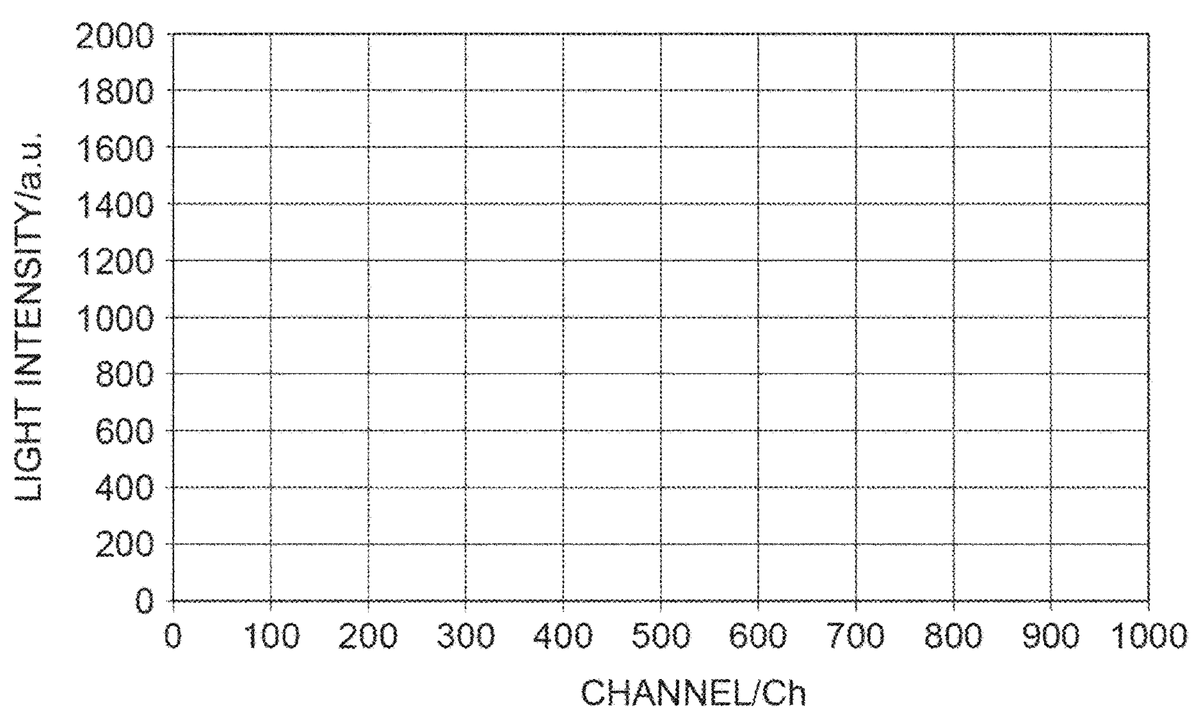

Fig.17
(a)
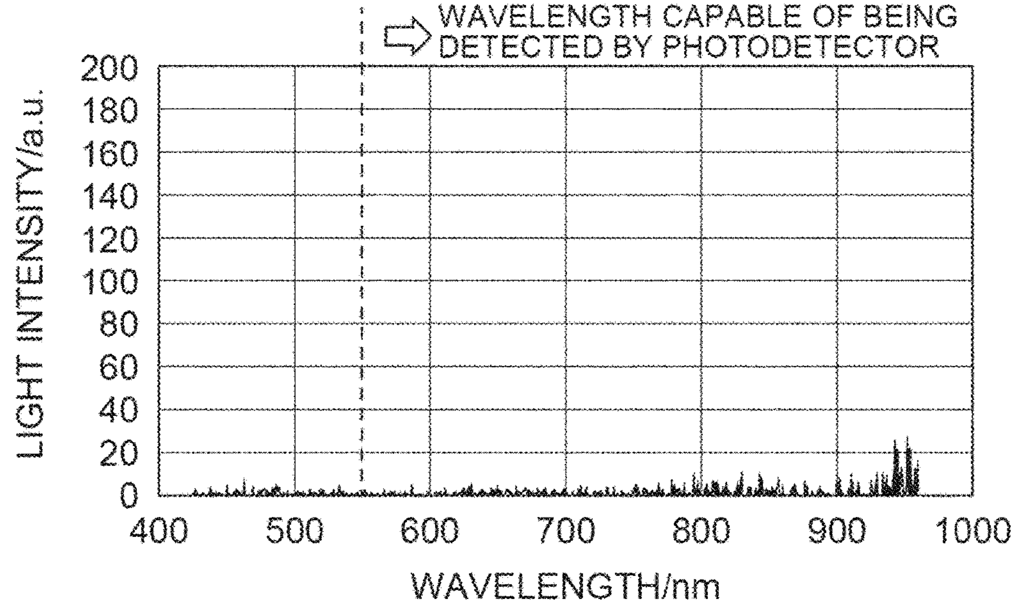
(b)
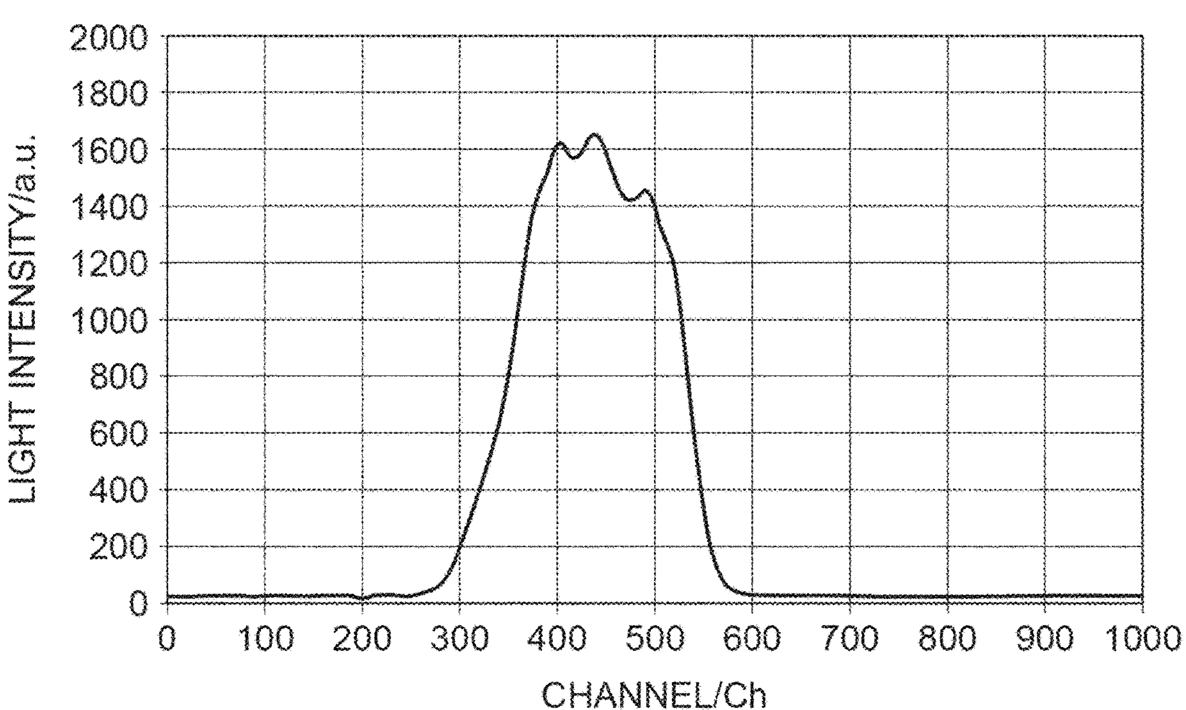

Fig.18

10
601
602
600
MOVEMENT
SCAN MEASUREMENT
500
SAMPLE STAGE
PULL-OUT TYPE TRAY
504
10

Fig.24

10
601
602
721
MOVEMENT
SCAN MEASUREMENT
500
SAMPLE STAGE
PULL-OUT TYPE TRAY
504
10

*Fig.25*
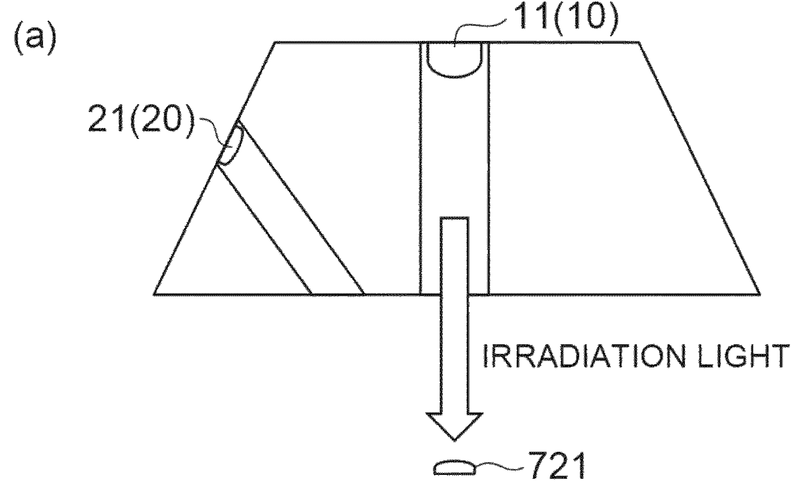
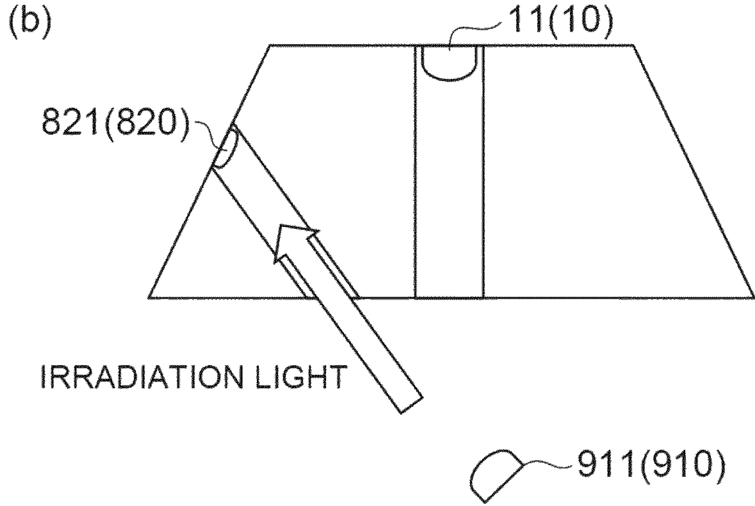

CALIBRATION

SCAN MEASUREMENT

500

504

SAMPLE STAGE

PULL-OUT TYPE TRAY

OPTICAL MEASUREMENT DEVICE AND OPTICAL MEASUREMENT METHOD

TECHNICAL FIELD

An aspect of the present invention relates to an optical measurement device and an optical measurement method for measuring optical characteristics of a sample.

BACKGROUND ART

Patent Literature 1 discloses technology for generating and deducting an attenuation signal to remove a fluorescence noise component (a fluorescence component from a substrate) included when a fluorescence sample placed on a substrate is irradiated with excitation light and fluorescence is measured. Specifically, in Patent Literature 1, a fluorescence noise component is removed by generating an attenuation signal having a phase equivalent to that of the fluorescence on the substrate and deducting the attenuation signal from a measured fluorescence signal.

CITATION LIST

Patent Literature

[Patent Literature 1] Japanese Unexamined Patent Publication No. 2010-518394

SUMMARY OF INVENTION

Technical Problem

As described above, in Patent Literature 1, a fluorescence noise component generated from a portion other than a measurement target portion of a sample is removed from fluorescence generated when the sample is irradiated with excitation light. Here, regarding a noise component included when a sample is irradiated with light and light from the sample is detected, it is assumed that not only light caused by light (for example, fluorescence) generated from the sample (which has been irradiated) but also light (for example, scattered light) caused by irradiation light (for example, excitation light) itself becomes a noise component. In the technology of Patent Literature 1, a case in which irradiation light itself becomes a noise component is not taken into consideration and the noise component cannot be removed.

On the other hand, the present inventors have found an optical measurement device for removing a noise component caused by irradiation light itself by paying attention to a phase difference between fluorescence and scattered light (light caused by the irradiation light itself) included in detection light and removing a signal component of the scattered light that is a signal component having a phase equivalent to that of the irradiation light from the detection light. In this optical measurement device, for example, a calibration process is performed in advance. In the calibration process, the light for the calibration process (ideally, the light including only scattered light) can be detected by irradiating a portion of the sample that is unlikely to generate fluorescence with the irradiation light and only the signal component substantially corresponding to the scattered light component can be removed from the detection signal on the basis of a calibration signal corresponding to the light for the calibration process.

Here, in the calibration process, a case in which the light for the calibration process substantially including only the scattered light is detected by irradiating a portion (for example, a region where it is determined that there is a small amount of fluorescent substance in the actual sample) of the sample from which it is difficult to generate fluorescence (for example, a sample formed in a chip for easy measurement, hereinafter referred to as an actual sample) with irradiation light is conceivable. However, in the method of detecting light for the calibration process by irradiating the actual sample with irradiation light, it is difficult to completely remove the fluorescence from the light for the calibration process detected by the photodetector and a component of a small amount of fluorescence is included in light for processing the calibration signal. Thereby, it is found that the calibration process is performed on the basis of the scattered light component and a component of a small amount of fluorescence and therefore it may be difficult to perform the subsequent fluorescence measurement with high accuracy as a result of the calibration process affected by the fluorescence component.

An aspect of the present invention has been made in consideration of the above-described circumstances and an objective of the present invention is to provide an optical measurement device and an optical measurement method capable of removing a noise component caused by irradiation light itself and performing fluorescence measurement with high accuracy.

Solution to Problem

According to an aspect of the present invention, there is provided an optical measurement device for measuring optical characteristics of a measurement target object, the optical measurement device including: an irradiation optical system configured to irradiate an irradiation target with irradiation light; a photodetection unit configured to detect detection light caused by the irradiation light; and a signal processing unit configured to process a detection signal corresponding to the detection light, wherein, in a first process, the irradiation optical system designates a reference member for a calibration process different from the measurement target object as the irradiation target and irradiates the reference member with the irradiation light, the photodetection unit detects light for the calibration process as the detection light, the light for the calibration process including scattered light associated with the irradiation light from the reference member irradiated with the irradiation light, and the signal processing unit designates a calibration signal corresponding to the light for the calibration process as the detection signal and performs the calibration process for removing a signal component corresponding to the scattered light from the detection signal in a second process on the basis of the calibration signal, and wherein, in the second process, the irradiation optical system designates the measurement target object as the irradiation target and irradiates the measurement target object with the irradiation light, the photodetection unit detects measurement target light as the detection light, the measurement target light including fluorescence generated from the measurement target object irradiated with the irradiation light and light scattered from the measurement target object irradiated with the irradiation light, and the signal processing unit designates a measurement signal corresponding to the measurement target light as the detection signal and removes a signal component corresponding to the scattered light in the calibration process during the first process from the measurement signal.

In the optical measurement device according to the aspect of the present invention, in the first process related to the calibration process, the reference member different from the measurement target object is irradiated with the irradiation light and the light for the calibration process including the scattered light is detected. In the second process, it is possible to remove a noise component caused by the irradiation light itself and perform fluorescence measurement with high accuracy by removing the signal component corresponding to the scattered light from the measurement signal appropriately on the basis of the result of performing the calibration process. Also, the reference member for the calibration process different from the measurement target object is used, such that there is no problematic variation in the result of the calibration process corresponding to characteristics of the measurement target object, for example, when the measurement target object is irradiated with the irradiation light and the light for the calibration process is detected. Thus, the fluorescence measurement can be performed with higher accuracy. In this way, the optical measurement device according to the aspect of the present invention can perform the calibration process more appropriately, remove the noise component caused by the irradiation light itself more appropriately, and perform the fluorescence measurement with higher accuracy.

The reference member may include a reflection member configured to reflect the irradiation light. According to this configuration, it is possible to increase an intensity of the detection light easily.

Preferably, the reflection member may prevent the fluorescence from being generated due to radiation of the irradiation light. According to this configuration, even if the irradiation light is radiated, fluorescence caused by the reflection member is not generated (or only negligible fluorescence is generated), such that only the signal component corresponding to the scattered light component from the measurement signal can be reliably removed in the second process.

The reflection member may include a reflection diffuser configured to diffuse the irradiation light. According to this configuration, the reflection diffuser can easily generate scattered light at various angles and the intensity of the detection light can be increased more easily.

The reflection member may include a reflection base material configured to reflect the irradiation light; and a diffuser supported by the reflection base material and configured to diffuse the irradiation light. According to this configuration, an intensity of the detection light can be more easily increased by the reflection base material and the diffuser in cooperation.

The reflection member may include a mirror. According to this configuration, the intensity of the detection light can be increased more easily by adjusting the reflection angle of the mirror with respect to the photodetection unit.

According to an aspect of the present invention, there is provided an optical measurement device for measuring optical characteristics of a measurement target object, the optical measurement device including: an irradiation optical system configured to radiate irradiation light; a photodetection unit including a first detection optical system and a second detection optical system configured to detect detection light caused by the irradiation light; and a signal processing unit configured to process a detection signal corresponding to the detection light, wherein, in a first process, the irradiation optical system irradiates the first detection optical system with the irradiation light, the first detection optical system of the photodetection unit detects light for a calibration process, which is the irradiation light, as the detection light, and the signal processing unit designates a calibration signal corresponding to the light for the calibration process as a detection signal and performs a calibration process for removing a signal component corresponding to scattered light from the detection signal in a second process on the basis of the calibration signal, and wherein, in the second process, the irradiation optical system irradiates the measurement target object with the irradiation light, the second detection optical system of the photodetection unit detects measurement target light as the detection light, the measurement target light including fluorescence generated from the measurement target object irradiated with the irradiation light and light scattered from the measurement target object irradiated with the irradiation light, and the signal processing unit designates a measurement signal corresponding to the measurement target light as the detection signal and removes a signal component corresponding to the scattered light in the calibration process during the first process from the measurement signal.

In the optical measurement device according to the aspect of the present invention, in the first process related to the calibration process, the first detection optical system is directly irradiated with the irradiation light and the light for the calibration process, which is the irradiation light, is detected. The irradiation light is light having the same phase as the scattered light. Thus, the first detection optical system detects the irradiation light as the light for the calibration process and therefore it is possible to appropriately detect light that does not include fluorescence and has the same phase as the scattered light as the light for the calibration process. Thereby, in the second process, it is possible to remove a noise component caused by the irradiation light itself and perform fluorescence measurement with high accuracy by removing the signal component corresponding to the scattered light from the measurement signal appropriately on the basis of the result of performing the calibration process. Also, because the light for the calibration process is detected in a state in which the measurement target object is not irradiated with the irradiation light, there is no problematic variation in the result of the calibration process corresponding to characteristics of the measurement target object, for example, when the measurement target object is irradiated with the irradiation light and the light for the calibration process is detected. Thus, the fluorescence measurement can be performed with higher accuracy. In this way, the optical measurement device according to the aspect of the present invention can perform the calibration process more appropriately, remove the noise component caused by the irradiation light itself more appropriately, and perform the fluorescence measurement with higher accuracy.

According to an aspect of the present invention, there is provided an optical measurement device for measuring optical characteristics of a measurement target object, the optical measurement device including: an irradiation optical system configured to radiate irradiation light corresponding to a modulated signal; a photodetection unit configured to detect detection light caused by the irradiation light; and a signal processing unit, wherein, in a first process, the signal processing unit designates scattered light associated with the irradiation light radiated from the irradiation optical system as the detection light, generates a calibration signal by changing a phase of the modulated signal in accordance with a delay corresponding to a period until the photodetection unit detects the detection light, and performs a calibration process for removing a signal component corresponding to scattered light from the detection signal in a second process on the basis of the calibration signal, and wherein, in the second process, the irradiation optical system irradiates the measurement target object with the irradiation light, the photodetection unit detects measurement target light as the detection light, the measurement target light including fluorescence generated from the measurement target object irradiated with the irradiation light and light scattered from the measurement target object irradiated with the irradiation light, and the signal processing unit designates a measurement signal corresponding to the measurement target light as the detection signal and removes a signal component corresponding to the scattered light in the calibration process during the first process from the measurement signal.

In the optical measurement device according to an aspect of the present invention, in the first process related to the calibration process, the calibration signal obtained by changing the phase of the modulated signal input to the irradiation optical system in accordance with the delay of the irradiation optical system is generated. In this way, it is possible to obtain a calibration signal similar to that when the scattered light has been actually detected as the light for the calibration process (a calibration signal having a phase similar to that of the scattered light) without detecting the light for the calibration process by generating the calibration signal in accordance with the delay of the irradiation optical system with respect to the modulated signal related to the irradiation light. That is, according to this configuration, it is possible to obtain a calibration signal of only the signal component of the scattered light that does not include the signal component of the fluorescence. Thereby, in the second process, it is possible to remove a noise component caused by the irradiation light itself and perform fluorescence measurement with high accuracy by removing the signal component corresponding to the scattered light from the measurement signal appropriately on the basis of the result of performing the calibration process. Also, because the light for the calibration process is detected in a state in which the measurement target object is not irradiated with the irradiation light, there is no problematic variation in the result of the calibration process corresponding to characteristics of the measurement target object, for example, when the measurement target object is irradiated with the irradiation light and the light for the calibration process is detected. Thus, the fluorescence measurement can be performed with higher accuracy. In this way, the optical measurement device according to the aspect of the present invention can perform the calibration process more appropriately, remove the noise component caused by the irradiation light itself more appropriately, and perform the fluorescence measurement with higher accuracy.

In the first process, the signal processing unit may set an amplitude of the calibration signal in accordance with an amplitude of a case in which the photodetection unit detects the scattered light associated with the irradiation light radiated from the irradiation optical system as the detection light. Thereby, it is possible to obtain a calibration signal closer to that when the scattered light has been actually detected as the light for the calibration process.

According to an aspect of the present invention, there is provided an optical measurement method of measuring optical characteristics of a measurement target object, the optical measurement method including: a first process including irradiating a reference member for a calibration process different from the measurement target object with irradiation light; detecting light for a calibration process including scattered light associated with the irradiation light from the reference member irradiated with the irradiation light; and performing the calibration process for removing a signal component corresponding to the scattered light from a measurement signal on the basis of a calibration signal corresponding to the light for the calibration process, and a second process including irradiating the measurement target object with the irradiation light; detecting measurement target light including fluorescence generated from the measurement target object irradiated with the irradiation light and light scattered from the measurement target object irradiated with the irradiation light; and removing a signal component corresponding to the scattered light in the calibration process during the first process from the measurement signal corresponding to the measurement target light.

According to an aspect of the present invention, there is provided an optical measurement method of measuring optical characteristics of a measurement target object, the optical measurement method including: a first process including radiating irradiation light; detecting light for a calibration process that is the irradiation light; and performing a calibration process for removing a signal component corresponding to scattered light from a measurement signal on the basis of a calibration signal corresponding to the light for the calibration process, and a second process including irradiating the measurement target object with the irradiation light; detecting measurement target light including fluorescence generated from the measurement target object irradiated with the irradiation light and light scattered from the measurement target object irradiated with the irradiation light; and removing a signal component corresponding to the scattered light in the calibration process during the first process from the measurement signal corresponding to the measurement target light.

According to an aspect of the present invention, there is provided an optical measurement method of measuring optical characteristics of a measurement target object, the optical measurement method including: a first process including generating a calibration signal by changing a phase of a modulated signal input to an irradiation optical system in accordance with a delay corresponding to a period until a photodetection unit detects scattered light associated with irradiation light radiated from the irradiation optical system and performing a calibration process for removing a signal component corresponding to scattered light from a measurement signal on the basis of the calibration signal, and a second process including: irradiating the measurement target object with the irradiation light; detecting the measurement target light including fluorescence generated from the measurement target object irradiated with the irradiation light and light scattered from the measurement target object irradiated with the irradiation light; and removing a signal component corresponding to the scattered light in the calibration process during the first process from the measurement signal corresponding to the measurement target light.

Advantageous Effects of Invention

According to the aspect of the present invention, it is possible to remove a noise component caused by irradiation light itself and perform fluorescence measurement with high accuracy.

BRIEF DESCRIPTION OF DRAWINGS

FIG. 11 is a diagram for describing a calibration process.

FIG. 12 is a table showing a proportion of a fluorescence component for each modulated frequency.

FIG. 13 is a flowchart showing a calibration process.

FIG. 14 is a diagram for describing the effects of the calibration process.

FIG. 15 is a diagram for describing a fluorescence measurement procedure.

FIG. 16 is a diagram for describing the effects of calibration when a reference member that generates fluorescence is used.

FIG. 17 is a diagram for describing the effects of calibration when a reference member that does not generate fluorescence is used.

FIG. 18 is a diagram for describing an outline of fluorescence measurement in a first mode.

FIG. 24 is a diagram for describing an outline of fluorescence measurement in the second mode.

FIG. 25 is a diagram for describing the acquisition of irradiation light of the second mode.

FIG. 28 is a diagram for describing an outline of fluorescence measurement in the third mode.

DESCRIPTION OF EMBODIMENTS

Figure 1:
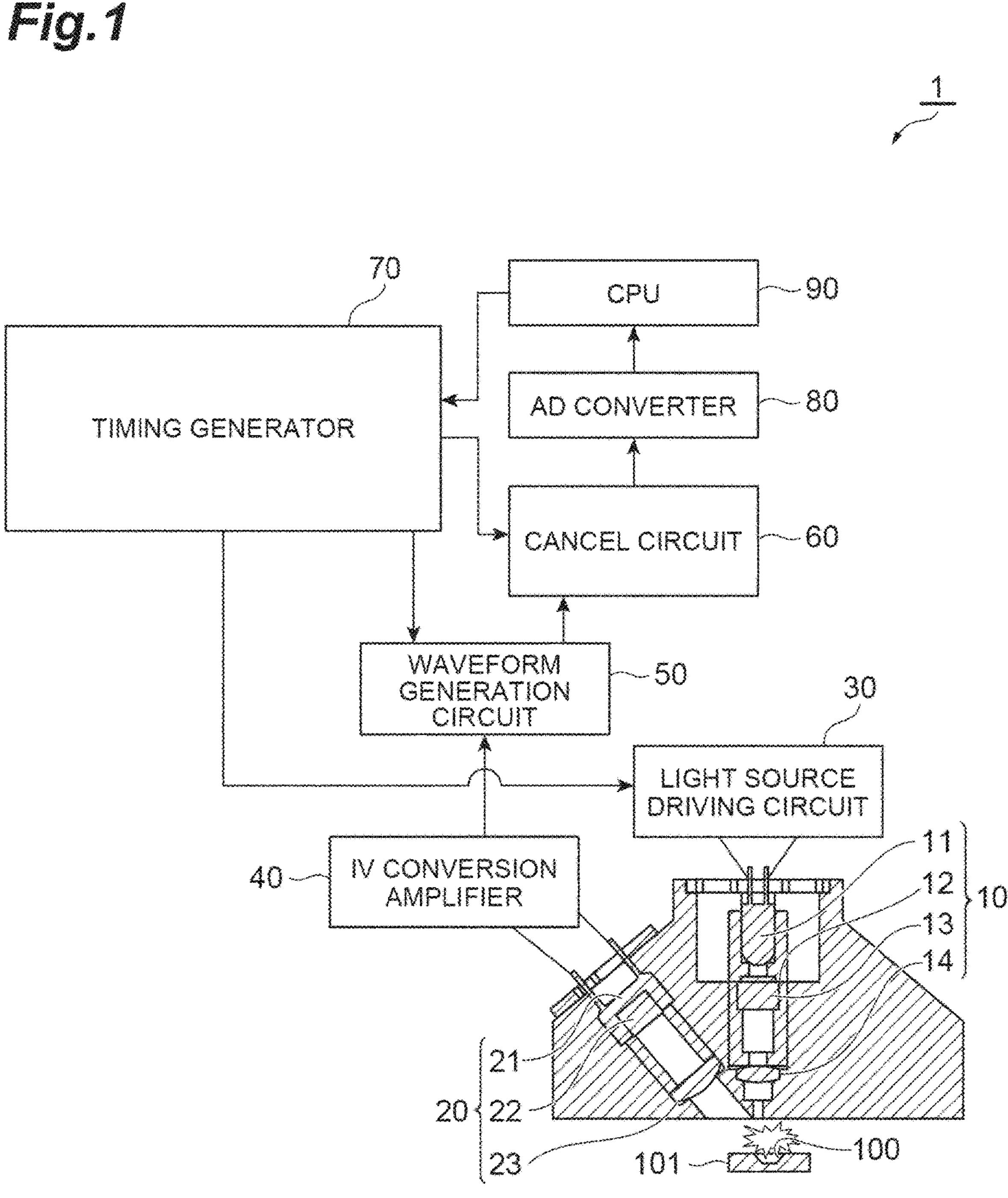
FIG. 1 is a diagram of a schematic configuration of an optical measurement device according to an embodiment of the present invention.

Hereinafter, embodiments of the present invention will be described in detail with reference to the drawings. In the drawings, the same or corresponding parts are denoted by the same reference signs and redundant description thereof will be omitted.

FIG. 1 is a diagram of a schematic configuration of an optical measurement device 1 according to the present embodiment. The optical measurement device 1 is a device for detecting light generated from a sample in accordance with light with which the sample is irradiated. In the present embodiment, the optical measurement device 1 will be described as a fluorescence measurement device for detecting fluorescence generated from a sample in accordance with excitation light (irradiation light) with which the sample is irradiated. Excitation light is light for exciting a sample and fluorescence is light emitted by a sample in accordance with excitation light and is light having a wavelength different from that of the excitation light. Also, in the present embodiment, the optical measurement device 1 will be described as a device for detecting fluorescence related to measurement using an immuno-chromatography method. The immuno-chromatography method is an immunity measurement method using an antigen-antibody reaction. For example, the immuno-chromatography method is used for detecting an influenza virus or the like.

As shown in FIG. 1, an immuno-chromatography test piece 100 is provided as a sample for measurement using the immuno-chromatography method. The immuno-chromatography test piece 100 accommodates an immuno-chromatographic membrane serving as a measurement target object inside of a reagent holder 101. A capture antibody for a prescribed antigen (for example, an antibody for an influenza virus antigen) is fixed at a specific position (a measurement target portion) in the immuno-chromatographic membrane of the immuno-chromatography test piece 100. A specimen spot application window that is an opening for dripping a specimen in the immuno-chromatographic membrane and a measurement window that is an opening for measuring a measurement target portion to which a capture antibody is fixed are provided in the reagent holder 101. When the specimen is dripped into the specimen spot application window of the reagent holder 101, an antigen in the specimen is first combined with a detected antibody labeled with a fluorescent reagent, subsequently causes an antigen-antibody reaction associated with the capture antibody, and is trapped. The optical measurement device 1 measures an intensity of fluorescence by irradiating the immuno-chromatographic membrane exposed from the measurement window of the immuno-chromatography test piece 100 with excitation light and detecting fluorescence from an antigen-antibody complex (specifically, a fluorescent reagent of an antibody) in the measurement target portion. Also, for example, europium, Q-dot (registered trademark), an organic dye, or the like can be used as the fluorescent reagent.

Here, it is assumed that detection light incident on and detected by a detection optical system 20 to be described below in the optical measurement device 1 includes light caused by excitation light itself as well as fluorescence. Examples of such light include scattered light associated with the excitation light. For example, this scattered light is a part of excitation light generated when the immuno-chromatography test piece 100 is irradiated with the excitation light and the excitation light is scattered, and the scattered light is light having a phase equivalent to that of the excitation light (there is no phase difference therebetween). Because the immuno-chromatographic membrane of the immuno-chromatography test piece 100 and the reagent holder 101 are generally white, the scattered light described above is likely to be generated. Also, the excitation light itself may be detected according to an arrangement of a sample to be measured or a detection optical system. Hereinafter, a case in which detection light detected in the optical measurement device 1 includes fluorescence and scattered light will be described.

As shown in FIG. 1, the optical measurement device 1 includes an irradiation optical system 10, a detection optical system 20 (a photodetection unit), a light source driving circuit 30, an IV conversion amplifier 40, a waveform generation circuit 50, a cancel circuit 60 (a signal processing unit), a timing generator 70, an AD converter 80, and a CPU 90.

The irradiation optical system 10 irradiates the immuno-chromatography test piece 100 that is the measurement target object (the sample) with excitation light (irradiation light). The irradiation optical system 10 has a light source 11, an aperture 12, an excitation light filter 13, and a collimating lens 14. The light source 11 irradiates the immuno-chromatography test piece 100 (the sample) with the excitation light. For example, the light source 11 is a semiconductor light-emitting element. Although a case in which the light source 11 is a light-emitting diode (LED) will be described in the present embodiment, the light source 11 is not limited thereto. For example, an LD may be used to ensure a light intensity. The aperture 12 is a luminous flux shaping member for shaping light emitted from the light source 11 into light having a desired luminous flux cross section. The excitation light filter 13 is a wavelength selection filter for filtering a wavelength necessary for excitation with respect to excitation light which has arrived via the aperture 12. For example, the excitation light filter 13 is an optical filter such as a dielectric multi-layer film filter or a color glass filter. In more detail, the excitation light filter 13 is a band-pass filter including a dielectric multi-layer film filter that transmits only a specific wavelength range (an excitation wavelength of a fluorescent reagent). The collimating lens 14 is a lens for forming an image of excitation light after a filtering process of the excitation light filter 13 on the immuno-chromatography test piece 100 (in detail, the measurement target portion of the immuno-chromatographic membrane).

The detection optical system 20 detects detection light caused by the excitation light. Specifically, the detection optical system 20 detects fluorescence from the immuno-chromatography test piece 100. However, in reality, in addition to fluorescence from the immuno-chromatography test piece 100 (fluorescence from the measurement target portion of the immuno-chromatographic membrane), the above-described detection light which is light including scattered light caused by excitation light itself is incident on the detection optical system 20 and the detection light is detected. The detection optical system 20 has a photodetection element 21, a fluorescence filter 22, and a condensing lens 23. The detection light is condensed by the condensing lens 23 and is incident on the photodetection element 21 via the fluorescence filter 22. The fluorescence filter 22 is a wavelength selection filter provided to limit the arrival of light other than fluorescence at the photodetection element 21 with respect to the detection light from the immuno-chromatography test piece 100. The fluorescence filter 22 is, for example, an optical filter such as a dielectric multi-layer film filter or a color glass filter. In more detail, the fluorescence filter 22 is a band-pass filter in which a dielectric multi-layer film filter and a color glass filter are combined to transmit light of only a specific wavelength range. However, for example, in a case in which an excitation light wavelength and a fluorescence wavelength are similar to each other or the like, it is difficult to efficiently block only scattered light having an excitation light wavelength using the fluorescence filter 22 while appropriately transmitting fluorescence having a fluorescence wavelength. Also, the characteristics of a dielectric multi-layer film filter which is widely used for an efficient wavelength selection filter generally change with an incident angle of light. Thus, in the present embodiment, the fluorescence filter 22 includes a combination of a dielectric multi-layer film filter and a color glass filter and therefore scattered light in an oblique direction is effectively blocked by the color glass filter. However, it is also difficult to achieve a sufficient effect only by selecting a wavelength and it is difficult to prevent the entry of scattered light having various conditions efficiently. Hereinafter, a case in which detection light that arrives at the photodetection element 21 includes scattered light even if the fluorescence filter 22 is provided will be described.

The photodetection element 21 is an optical sensor for detecting detection light after a filtering process of the fluorescence filter 22. For example, the photodetection element 21 is a semiconductor light-receiving element. Although a case in which the photodetection element 21 is a photodiode (PD) will be described in the present embodiment, the photodetection element 21 is not limited thereto. An avalanche photodiode (APD), a photomultiplier tube (PMT), or the like may be adopted as long as it is possible to make a fast response in correspondence with a modulated frequency of excitation light from the light source 11 to be described below. In detail, the photodetection element 21 detects detection light including fluorescence generated from the immuno-chromatography test piece 100 irradiated with excitation light (in detail, a fluorescent reagent of an antigen-antibody complex in the measurement target portion of the immuno-chromatographic membrane) and the above-described scattered light which is light caused by the excitation light and has no phase difference with respect to the excitation light. The photodetection element 21 outputs a detection signal according to the detection light to the IV conversion amplifier 40.

The light source driving circuit 30 is a circuit for driving the light source 11 by outputting a drive current to the light source 11 which is an LED. The light source driving circuit 30 receives an input of a frequency signal having a sine wave shape serving as reference from the timing generator 70. The light source driving circuit 30 modulates the frequency of the drive current on the basis of the input frequency signal serving as reference. That is, the light source driving circuit 30 sets the modulated frequency of the light source 11 that outputs excitation light. In response to this, the frequency of excitation light output from the light source 11 is modulated and an intensity of light (an intensity of excitation light) from the light source 11 changes into a sine wave shape. Also, the modulated frequency may be determined on the basis of a fluorescence lifespan of a fluorescent reagent to be used. For example, when europium having a fluorescence lifespan of several milliseconds is used for a fluorescent reagent, the modulated frequency may be set to approximately 1 kHz. When Q-dot having a fluorescence lifespan of several tens of nanoseconds is used, the modulated frequency may be set to approximately 100 MHz. When an organic dye having a fluorescence lifespan within a range of several nanoseconds to several tens of nanoseconds is used, the modulated frequency may be set to approximately 1 GHz.

Generally, a fluorescence lifespan is a period of time taken until an intensity of fluorescence drops from a peak value to 1/e (approximately 37%). If a reverse operation is performed from this definition of a fluorescence lifespan, for example, it is preferably assumed that an optimum modulated frequency is 1 kHz when europium having a fluorescence lifespan of several milliseconds is used and an optimum modulated frequency is within a range of approximately 100 MHz to 1 GHz when an organic dye having a fluorescence lifespan within a range of several nanoseconds to several tens of nanoseconds is used. However, it has become clear that an intensity of fluorescence increases and a proportion of a fluorescence signal with respect to excitation light also increases when modulation is performed at a frequency lower than a frequency determined from the fluorescence lifespan when a signal output derived from fluorescence with respect to the modulated frequency is actually measured using a europium reagent (see FIG. 12). As shown in FIG. 12, the intensity of fluorescence increases on a side of frequencies lower than 1 kHz which is a frequency determined from the fluorescence lifespan. Specifically, the intensity of fluorescence can be increased by defining the fluorescence lifespan as "a period of time taken until the peak value of the intensity of fluorescence drops to 1%" instead of 1/e, and obtaining the modulated frequency from the period of time. In this case, if europium is used, the fluorescence lifespan becomes approximately 10 ms and the modulated frequency of the light source 11 determined from this becomes approximately 100 Hz.

As described above, the light source driving circuit 30 may decide on the modulated frequency of the light source 11 in consideration of the intensity of fluorescence. Specifically, the light source driving circuit 30 sets the modulated frequency of the light source 11 such that it is less than a value corresponding to the fluorescence lifespan (in detail, 1/fluorescence lifespan) which is a period of time taken until the intensity of fluorescence drops from the peak value to 1/e. The light source driving circuit 30 sets the modulated frequency of the light source 11 such that it is less than a value corresponding to the fluorescence lifespan and higher than a commercial frequency (50 Hz or 60 Hz). For example, the modulated frequency thereof is set to approximately 110 Hz which is near 100 Hz and at which an influence of noise is reduced by avoiding double waves of the commercial frequency. The light source driving circuit 30 may set the modulated frequency of the light source 11 to another value near 100 Hz, for example, such as 90 Hz, 80 Hz, 70 Hz, or 130 Hz.

The IV conversion amplifier 40 converts a current signal (a detection signal) output from the photodetection element 21 into a voltage signal. The IV conversion amplifier 40 outputs a detection signal converted into a voltage signal to the waveform generation circuit 50.

The waveform generation circuit 50 is a circuit for generating a waveform of a detection signal on the basis of the detection signal output from the IV conversion amplifier 40. The waveform generation circuit 50 receives an input of a frequency signal serving as reference from the timing generator 70. The timing generator 70 inputs the frequency signal serving as the reference at the same timing to the light source driving circuit 30 and the waveform generation circuit 50. The waveform generation circuit 50 outputs information of the generated waveform (detection signal) to the cancel circuit 60.

The cancel circuit 60 is a signal processing unit for processing the waveform (the detection signal) generated by the waveform generation circuit 50. The cancel circuit 60 removes a signal component corresponding to scattered light from the detection signal on the basis of a difference (a phase difference) between phases of fluorescence and scattered light. Also, the cancel circuit 60 acquires information of the phase of excitation light (i.e., scattered light) by receiving an input of a reference frequency signal from the timing generator 70 at the same timing together with the light source driving circuit 30 and the waveform generation circuit 50. Thereby, the removal of a signal component of scattered light based on the phase difference between fluorescence and scattered light can be performed in the cancel circuit 60. Details of the process of the cancel circuit 60 will be described with reference to FIGS. 2 to 4.

Figure 2:
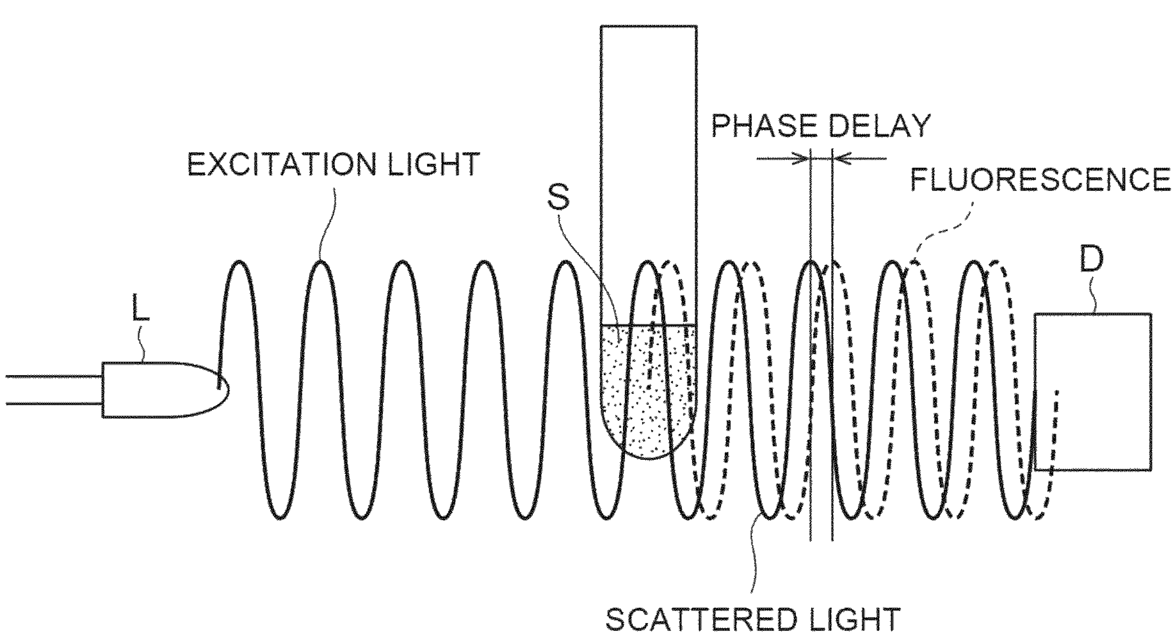
FIG. 2 is a diagram for describing a phase difference between fluorescence and scattered light.

FIG. 2 is a conceptual diagram for describing a phase difference between fluorescence and scattered light. As shown in FIG. 2, sine wave-shaped detection light from a sample S irradiated with sine wave-shaped excitation light from a light source unit L (detection light detected by a photodetection unit D) includes scattered light and fluorescence having sine wave shapes. Also, the shape of excitation light from the light source unit L is not limited to a sine wave shape and a cyclic modulation waveform of a rectangular wave or the like may be adopted. In this case, detection light (scattered light and fluorescence) also has a cyclic modulation waveform similar to that of excitation light. The scattered light is light having no phase difference with respect to excitation light, whereas the fluorescence is light which is generated from the sample S in accordance with excitation light and has a phase detected with a delay within a range of approximately several tens of milliseconds to nanoseconds with respect to the scattered light. The present inventors have focused on such a phase difference and have found a technique for removing only scattered light from detection light and extracting only fluorescence. Because the sample S and the photodetection unit D are disposed on an optical axis of the light source unit L in FIG. 2, fluorescence emitted in a direction coaxial with the optical axis of excitation light is detected unlike FIG. 1 in which fluorescence emitted in a direction orthogonal to an optical axis of excitation light is detected. In this case, in addition to fluorescence and scattered light included in detection light, there is also a possibility that excitation light itself will be included. Also, there is a high possibility that an intensity of light incident on the photodetection unit D and caused by the excitation light will also increase. Thus, fluorescence can be effectively extracted using this technique.

Figure 3:
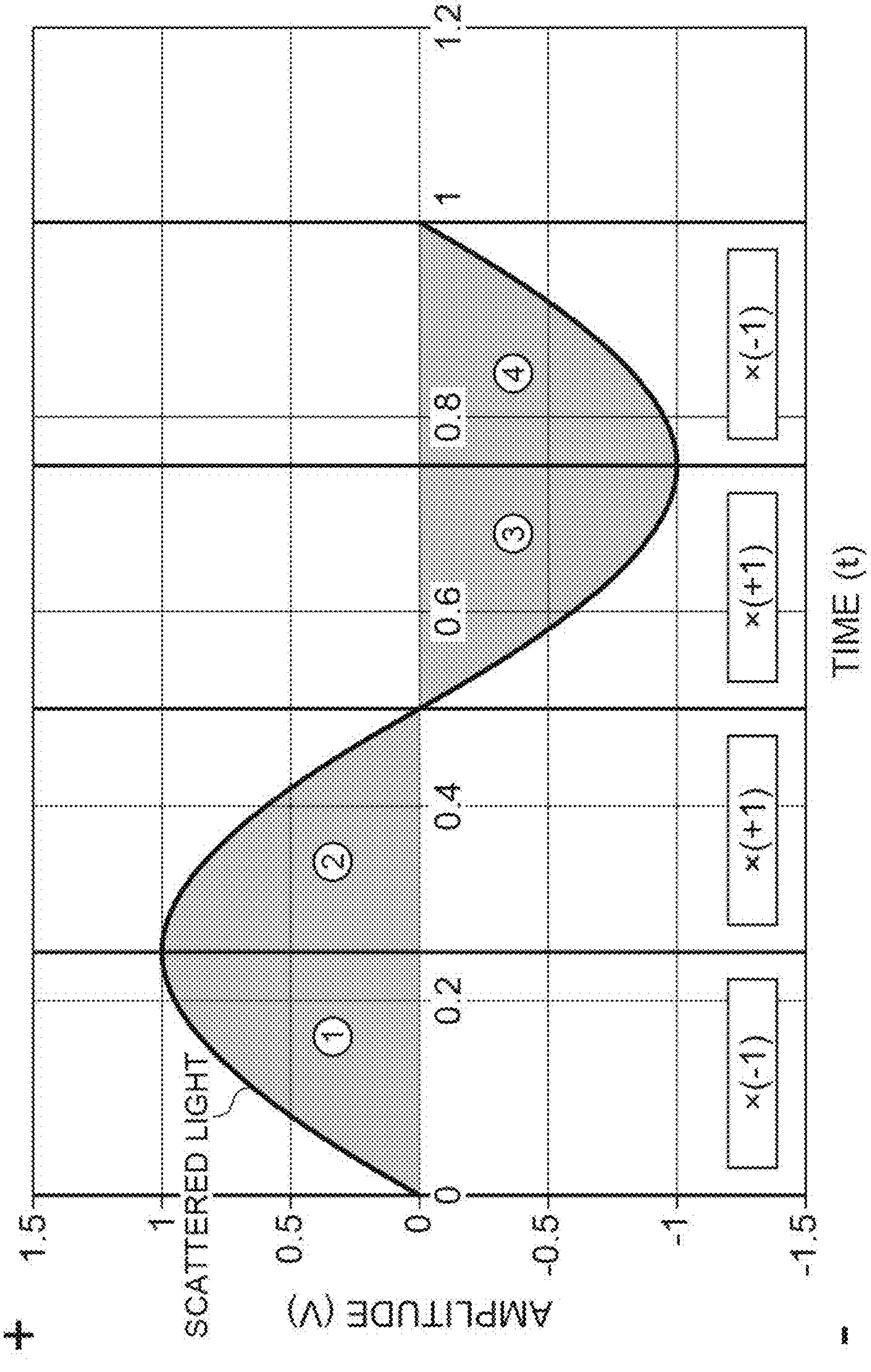
FIG. 3 is a diagram for describing a scattered light cancellation method.

FIG. 3 is a diagram for describing a technique for removing (canceling) scattered light. FIG. 3 shows only a waveform of scattered light within detection light. This waveform is equivalent to a waveform of excitation light. In FIG. 3, the horizontal axis represents time and the vertical axis represents amplitude. When the waveform corresponding to the phase of scattered light shown in FIG. 3 is separated, for example, in units of times of ¼ of one cycle (divided into time periods) and an integral operation is performed for each of time periods 1 to 4, an output of scattered light in each of time periods 1 to 4 can be obtained. Here, when each of integral values of time periods 1 to 4 is multiplied by a certain multiplier and a sum of all multiplication results is obtained, a sum of outputs thereof can become zero. That is, absolute values of the outputs of time periods 1 to 4 are the same, the range of the amplitudes of time periods 1 and 2 is positive, and the range of the amplitudes of time periods 3 and 4 is negative. As shown in FIG. 3, an output of time period 1 has a negative value due to "positive value×negative value" when an amplification operation is performed by multiplying a multiplier "−1" for time period 1, an output of time period 2 has a positive value due to "positive value×positive value" when an amplification operation is performed by multiplying a multiplier "+1" for time period 2, an output of time period 3 has a negative value due to "negative value×positive value" when an amplification operation is performed by multiplying a multiplier "+1"

for time period 3, and an output of time period 4 has a positive value due to "negative value×negative value" when an amplification operation is performed by multiplying a multiplier "−1" for time period 4. Thus, when all integral values of time periods 1 to 4 in which the amplification operation has been performed by multiplying a prescribed multiplier are added, the values are offset with each other and the sum of the outputs becomes zero. In this way, it is possible to remove signal components according to scattered light (or set outputs to zero) by separating the signal components in units of prescribed times according to the phase of scattered light, individually amplifying the separated components, and synthesizing the amplified components.

Figure 4:
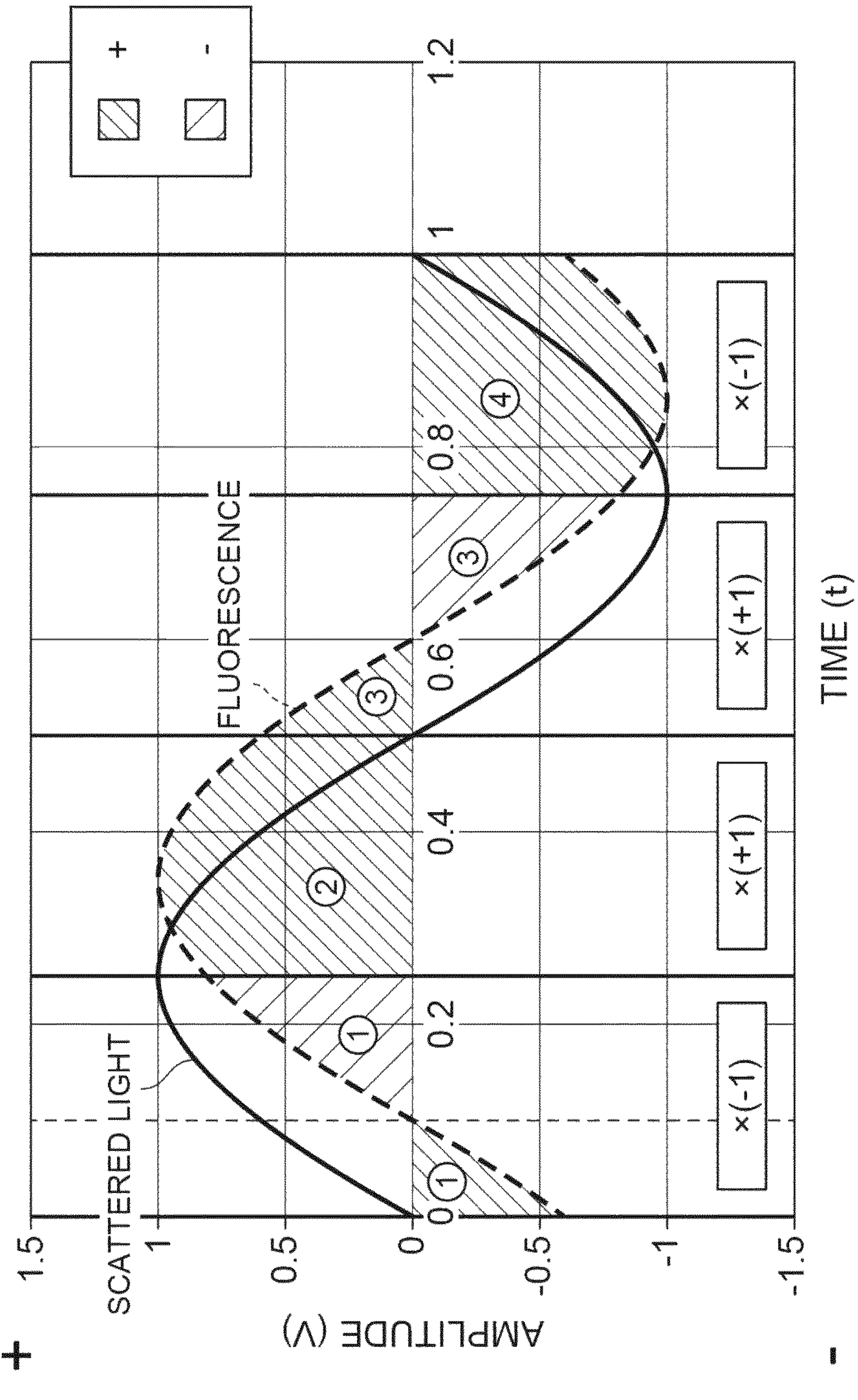
FIG. 4 is a diagram for describing a fluorescence measurement method.

FIG. 4 is a diagram for describing a fluorescence measurement method. FIG. 4 shows waveforms of scattered light and fluorescence included in a detection signal. In FIG. 4, the horizontal axis represents time and the vertical axis represents amplitude. As described above, it is possible to remove signal components according to scattered light (set outputs to zero) by separating the signal components in units of prescribed times according to the phase of scattered light, individually amplifying the separated components, and synthesizing the amplified components. Here, as shown in FIG. 4, because fluorescence has a phase difference with respect to scattered light, the integral values of time periods 1 to 4 do not become the same when a separation process is performed in units of prescribed times according to the phase of scattered light. Therefore, a non-zero value is output as a value obtained by multiplying a multiplier, individually carrying out an amplification process, and carrying out an addition process as in the case of the scattered light. In this way, it is possible to perform a wave detection and output process for an output intensity of fluorescence while removing a signal component of scattered light by separating scattered light and fluorescence in the same time period and carrying out an amplification operation and a synthesis operation thereon.

In this way, the cancel circuit 60 can remove a signal component corresponding to scattered light from a detection signal and obtain a signal component of fluorescence by separating the detection signal in units of prescribed times corresponding to the phase of scattered light, individually amplifying components of the separated detection signal, and synthesizing the amplified components. The cancel circuit 60 outputs a fluorescence signal that is a signal from which a signal component corresponding to scattered light is removed (i.e., a signal having only a signal component of fluorescence) to the AD converter 80. Although an example of a time period of ¼ of one cycle as a unit of prescribed time has been described, the unit is not limited thereto. Any unit of time may be adopted as long as it is a unit of time in which a signal component corresponding to scattered light can be removed after synthesis. Also, the examples of "+1" and "−1" as multipliers in the amplification operations have been described, the multipliers are not limited thereto. Any multiplier may be adopted as long as it is a multiplier with which a signal component corresponding to scattered light can be removed after synthesis.

The AD converter 80 converts a fluorescence signal output from the cancel circuit 60 into a digital value by performing AD conversion and outputs the digital value to the CPU 90. The CPU 90 performs prescribed control/signal processing for a digital signal (a fluorescence signal) output from the AD converter 80. The CPU 90 may transfer a signal processing result to an external computer through, for example, serial communication. Also, the CPU 90 may generate a signal output from the timing generator 70, i.e., a signal for deciding on various operation timings in the optical measurement device 1, and output the signals to the timing generator 70. Also, an FPGA may be used in place of the CPU 90. In the above-described process, the optical measurement device 1 can remove an influence of scattered light from detection light and obtain only a signal related to fluorescence of a fluorescent reagent.

Next, a fluorescence measurement process (an optical measurement method) performed by the optical measurement device 1 will be described with reference to FIG. 5.

Figure 5:
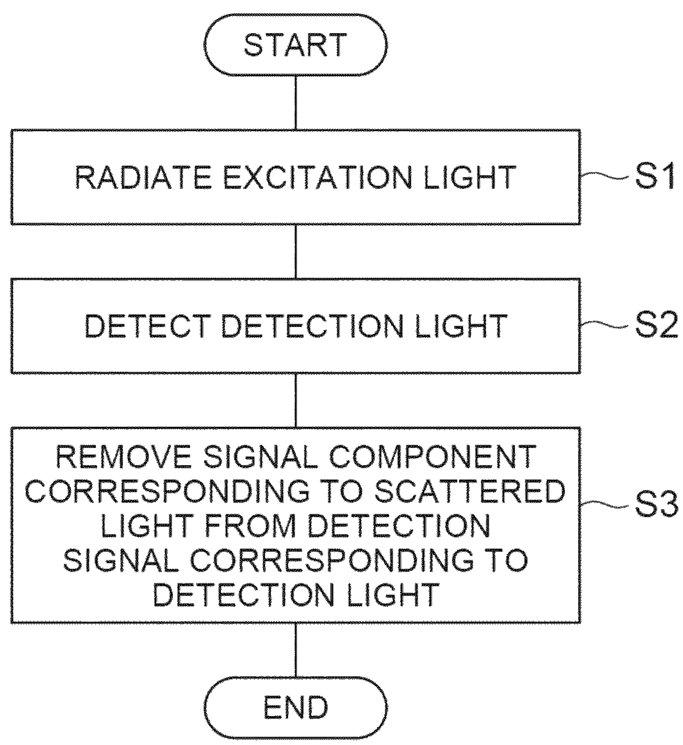
FIG. 5 is a flowchart showing a fluorescence measurement process of the optical measurement device.

FIG. 5 is a flowchart showing the fluorescence measurement process of the optical measurement device 1. As shown in FIG. 5, in the fluorescence measurement process, the light source 11 of the irradiation optical system 10 (a light source unit) initially irradiates the immuno-chromatography test piece 100 (the sample) with excitation light (step S1). When the immuno-chromatography test piece 100 (in detail, an antigen-antibody complex in the measurement target portion of the immuno-chromatographic membrane) is irradiated with excitation light, fluorescence is emitted from the fluorescent reagent of the antigen-antibody complex. On the other hand, excitation light is scattered by the immuno-chromatography test piece 100 and scattered light is generated.

Subsequently, the photodetection element 21 of the detection optical system 20 (a photodetection unit) detects detection light including the above-described fluorescence and scattered light (step S2). The photodetection element 21 outputs the detection light to the IV conversion amplifier 40. After a current signal (a detection signal) output from the photodetection element 21 in the IV conversion amplifier 40 is converted into a voltage signal and a waveform of the detection signal is generated in the waveform generation circuit 50, the cancel circuit 60 (a signal processing unit) removes a signal component corresponding to the scattered light from the detection signal on the basis of a phase difference between the fluorescence and the scattered light (step S3). Specifically, the cancel circuit 60 removes a signal component corresponding to the scattered light from the detection signal and obtains a signal component of fluorescence by separating the detection signal in units of prescribed times corresponding to the phase of the scattered light, individually amplifying components of the separated detection signal, and synthesizing the amplified components. Subsequently, a fluorescence signal is converted into a digital value in the AD converter 80 and prescribed control/signal processing is performed in the CPU 90, such that a signal related to the fluorescence can be obtained.

Figure 6:
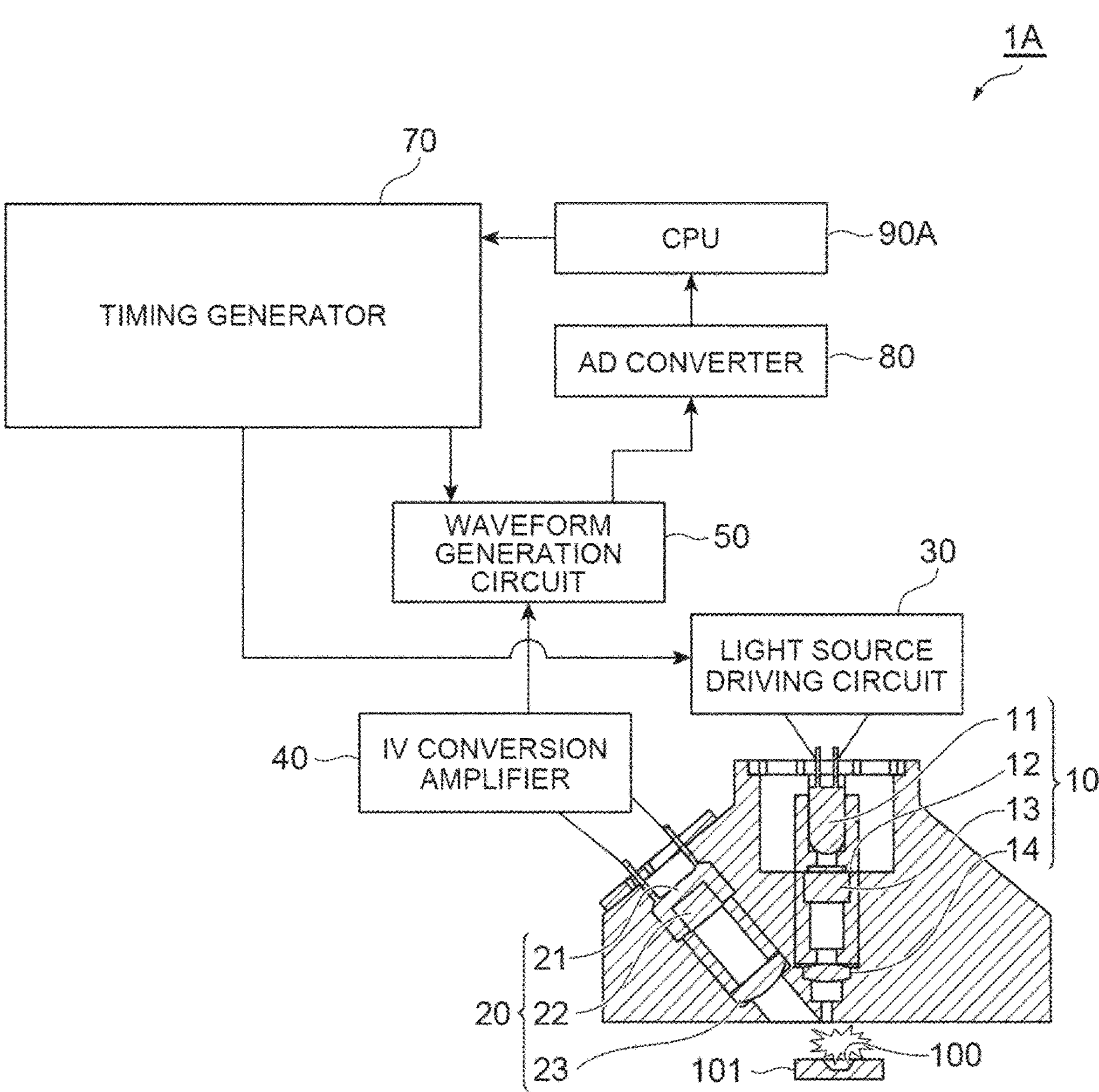
FIG. 6 is a diagram of a schematic configuration of the optical measurement device.

Although a case in which the optical measurement device 1 removes the signal component corresponding to the scattered light from the detection signal in the cancel circuit 60 has been described, the present invention is not limited thereto. That is, as in an optical measurement device 1A shown in FIG. 6, a CPU 90A (a signal processing unit) may perform a process of removing a signal component corresponding to scattered light from a detection signal after an A/D conversion process of the AD converter 80 in a state in which the cancel circuit 60 is not provided. In this case, because it is not necessary to provide the cancel circuit 60, it is possible to contribute to the miniaturization of the device.

Next, the removal of a specific signal component (noise) described in the above-described embodiment will be more specifically described with reference to FIGS. 7 to 14.

Figure 7:
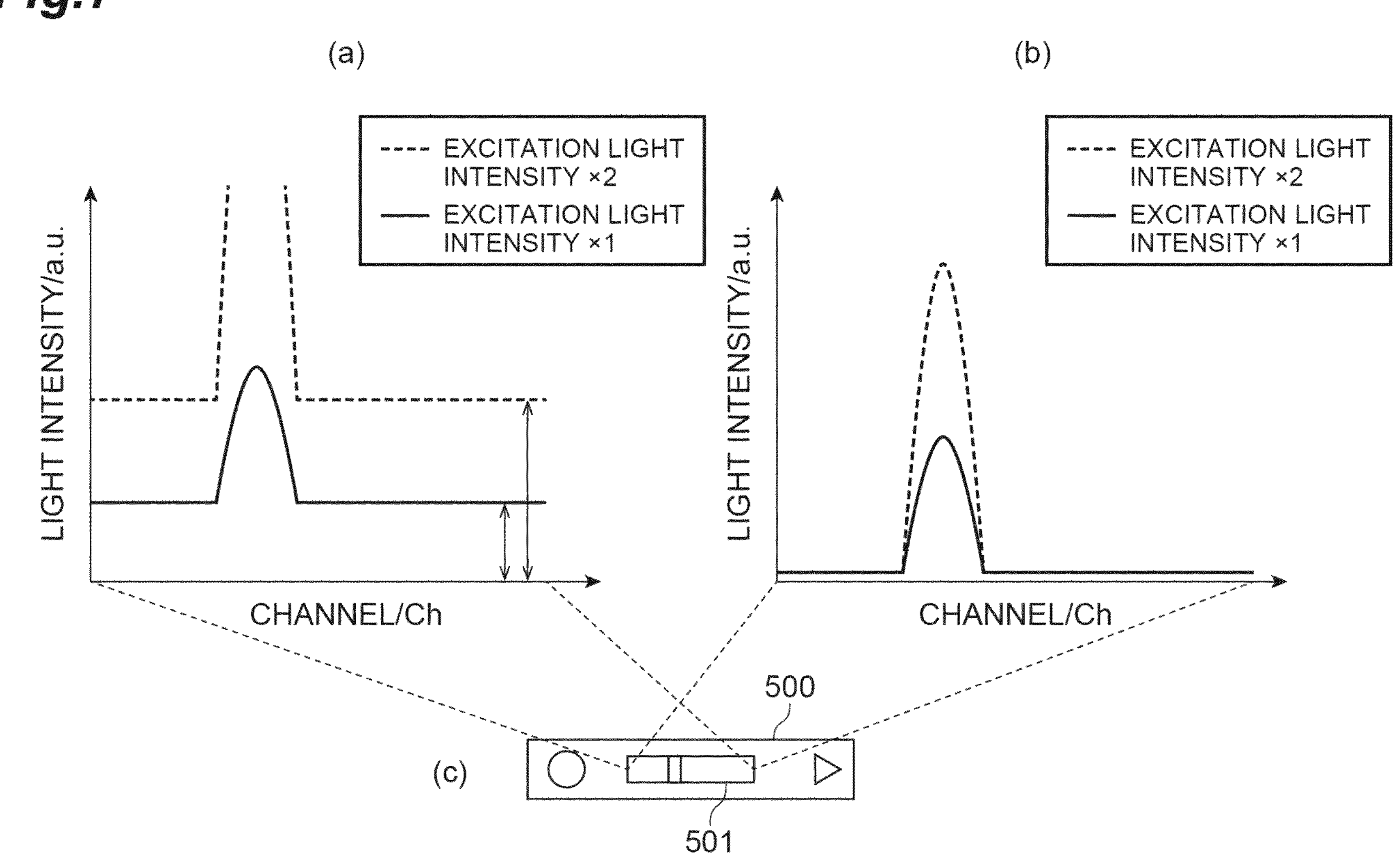
FIG. 7 is a diagram for describing the removal of a noise component.
Figure 8:
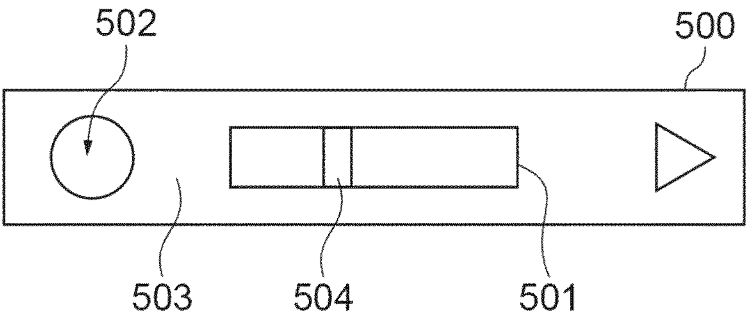
FIG. 8 is a diagram schematically showing a sample.

FIG. 7 is a diagram for describing the removal of a noise component. FIG. 7(*a*) shows an intensity of detection light when a signal component (noise) corresponding to scattered light caused by excitation light has not been removed and FIG. 7(*b*) shows an intensity of detection light when a signal component (noise) corresponding to scattered light caused by excitation light has been removed. In FIGS. 7(*a*) and 7(*b*), the vertical axis represents an intensity of detection light and the horizontal axis represents a channel indicating a position in a measurement portion 501 which is a measurement region of a sample 500. A size of one channel is, for example, 0.02 mm FIG. 7(*c*) is a diagram showing a region of the sample 500 corresponding to the position of the channel in FIGS. 7(*a*) and 7(*b*). An enlarged schematic diagram of the sample 500 shown in FIG. 7(*c*) is shown in FIG. 8. As shown in FIG. 8, in the sample 500, a dripping portion 502 for dripping a specimen, a holding portion 503 for holding a detected antibody labeled with a fluorescent reagent, and the measurement portion 501 in which a capture antibody is fixed to a measurement target portion 504 are disposed from an upstream side to a downstream side. For example, the fluorescent reagent is DTBTA-Eu3+. For example, because the measurement portion 501 is a part of a white immuno-chromatographic membrane, excitation light is likely to be scattered.

When a specimen is dripped into the dripping portion 502 with respect to this sample 500, the specimen moves to the downstream side due to a capillary phenomenon. When there is a substance to be detected within the specimen, the detected antibody in the holding portion 503 and the substance to be detected react and form a complex and this complex moves to the downstream side in the measurement portion 501. When the complex has arrived at the measurement target portion 504 on the measurement portion 501, the complex is captured by the capture antibody in the measurement target portion 504 and a complex including three elements such as the substance to be detected, the detected antibody, and the capture antibody is formed. In this state, when a condensing position (a channel) is changed and excitation light is radiated with respect to the measurement portion 501 that is a measurement region, the intensity of detection light of each channel as shown in FIGS. 7(*a*) and 7(*b*) can be derived. In FIGS. 7(*a*) and 7(*b*), the channel having a higher intensity of detection light than other channels is a channel corresponding to the position of the measurement target portion 504 in which the complex is captured.

As shown in FIG. 7(*a*), when a signal component (noise) corresponding to scattered light is not removed, the intensity of detection light becomes high because detection light includes scattered light as well as fluorescence. Because such noise increases as the intensity of excitation light increases, noise is also doubled similarly when the intensity of excitation light is doubled as shown in FIG. 7(*a*). Generally, a method of increasing a fluorescence signal intensity by increasing the intensity of excitation light may be considered as a method of improving S/N. However, it is difficult to improve S/N in a mode in which noise also increases in accordance with the intensity of excitation light as in FIG. 7(*a*) as described above. Furthermore, there is also a problem that a dynamic range is narrowed due to an increase in the intensity of excitation light.

On the other hand, as shown in FIG. 7(*b*), when a signal component (noise) corresponding to scattered light is removed, only fluorescence is generally included in the detection light and only a signal desired to be detected (a signal based on fluorescence) can be detected. In this case, because noise is substantially zero, an influence of excitation light (scattered light) can be canceled to almost zero and noise can be prevented from extremely increasing unless a photodetector is saturated even if the intensity of excitation light is increased (for example, even if it is doubled) as shown in FIG. 7(*b*). As above, in a configuration in which noise is removed as shown in FIG. 7(*b*), when excitation light is increased, only the signal component can be increased in a state in which the noise component is canceled to substantially zero, and thus this leads to improvement in S/N. Because the configuration is significantly robust to a noise component, the intensity of excitation light can be increased or a multiplication factor of an IV conversion amplifier can be increased.

Figure 9:
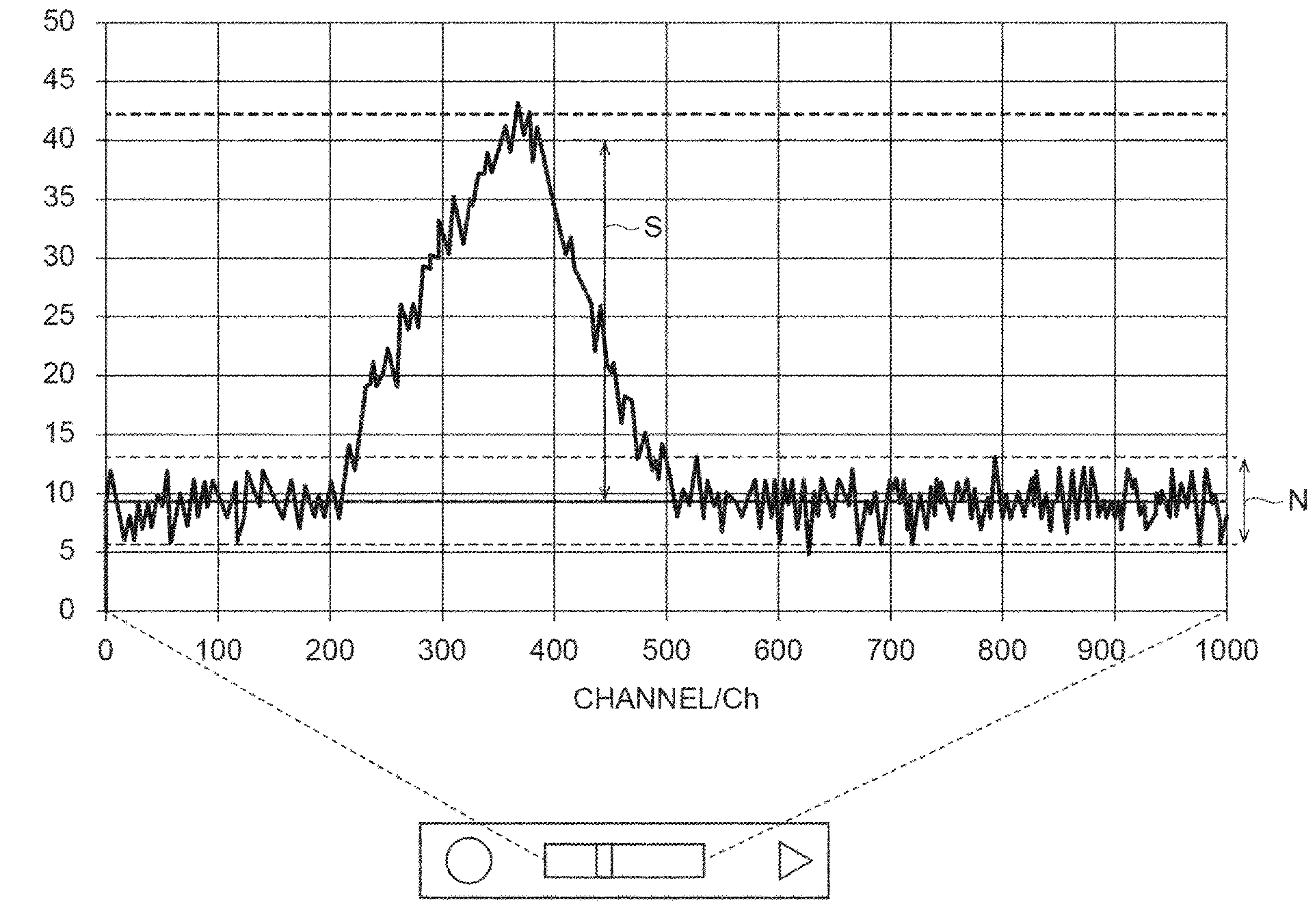
FIG. 9 is a diagram for describing the definition of S/N.

FIG. 9 is a diagram for describing the definition of S/N. FIG. 9 shows an example of the intensity of detection light (the intensity of detection light at each position in the measurement region) of each channel As shown in FIG. 9, a fluctuation component of approximately ±4 is present near a value of 10 counts associated with the intensity of detection light. Such fluctuation (standard deviation) in the intensity of base light is a value acquired by scanning the measurement portion 501, which is not coated with any of a fluorescent substance or the like, (or the measurement portion 501 in a wet state similar to the measurement state) with excitation light. Hereinafter, the fluctuation in the intensity of base light will be defined as noise N. Also, a signal S will be defined as "a value obtained by subtracting an average value of the noise components from which the position of the measurement target portion 504 is excluded in all channels from the peak intensity of fluorescence in the measurement target portion 504." S/N is defined as a value obtained by dividing the signal defined above by noise.

Also, in the example shown in FIG. 9, the value of noise is offset by approximately 10 counts. In principle, the value of noise is canceled to substantially zero by performing a calibration process to be described below. However, because the signal preferably has a positive value all the time from the viewpoint of analysis using software when a background varies with a value of noise, offset processing is performed for the background. Also, the amount of offset is set such that the signal falls in a dynamic range (in a range of 0 to 4,096 counts). The amount of offset is set such that it becomes as small as possible from the viewpoint of the dynamic range and a signal of the background obtained by scanning the measurement portion 501 with excitation light has a positive value all the time (substantially reliably). Specifically, the amount of offset may be, for example, a value of a sum of an average value of the intensity of detection light acquired by scanning the measurement portion 501, which is not coated with any of a fluorescent substance and the like, (or the measurement portion 501 in a wet state similar to the measurement state) with excitation light and 6σ of the average value of the intensity. Also, in preparation for a case in which a sudden noise jumps into a circuit system, a final amount of offset may be set by adding a suitable margin to the amount of offset calculated described above. The amount of offset may be selected such that the dynamic range is not sacrificed and a signal is not output as a negative value. For example, it may be approximately +20 counts.

Next, a technique for removing a signal component (noise) corresponding to scattered light will be specifically described. In the optical measurement device 1, a calibration process is performed in the cancel circuit 60, which is a lock-in circuit, and a signal component (noise) corresponding to scattered light is removed from a detection signal in consideration of a result of performing the calibration process.

Specifically, in the optical measurement method using the optical measurement device 1, initially, an optical head of the irradiation optical system 10 is disposed such that a reference member 600 (FIG. 15(*a*)) for the calibration process different from the sample 500 is irradiated with excitation light. Subsequently, scattered light caused when the reference member 600 is irradiated with excitation light from the irradiation optical system 10 (a component of excitation light scattered in the reference member 600) is detected in the photodetection element 21 of the detection optical system 20. Here, the light detected in the detection optical system 20 is basically light of only scattered light which does not include the fluorescence in the reference member 600 and is light for the calibration process for use in the calibration process.

Subsequently, the calibration process is performed. Specifically, the cancel circuit 60 of the optical measurement device 1 performs a calibration process for removing a signal component corresponding to scattered light from a detection signal on the basis of a calibration signal corresponding to the light for the calibration process described above. Details of the calibration process will be described below. After the calibration process is completed, fluorescence information of the measurement portion 501 is acquired by performing a scan operation on the measurement region (the measurement portion 501) of the sample 500 with the optical head of the irradiation optical system 10. Specifically, the cancel circuit 60 acquires the fluorescence information by removing a signal component corresponding to scattered light from a detection signal in consideration of a result of performing the calibration process described above.

Next, details of the calibration process will be described. For example, the cancel circuit 60 of the optical measurement device 1 is a lock-in circuit using a field programmable gate array (FPGA). In the calibration process, the cancel circuit 60 generates a lock-in switch signal having a phase shifted with respect to a cycle signal for marking a cycle at an operation frequency of the cancel circuit 60 according to the modulated frequency of the light source 11 (for example, a frequency of a direct digital synthesizer (DDS)) set by the light source driving circuit 30. The cancel circuit 60 functioning as a lock-in circuit outputs a signal component corresponding to scattered light when a calibration signal that is a measurement signal and a switch signal that is a reference signal are input and adjusts the phase of the switch signal within a prescribed range (a slash level) in which the voltage value of the signal component corresponding to the scattered light is close to zero.

Figure 10:
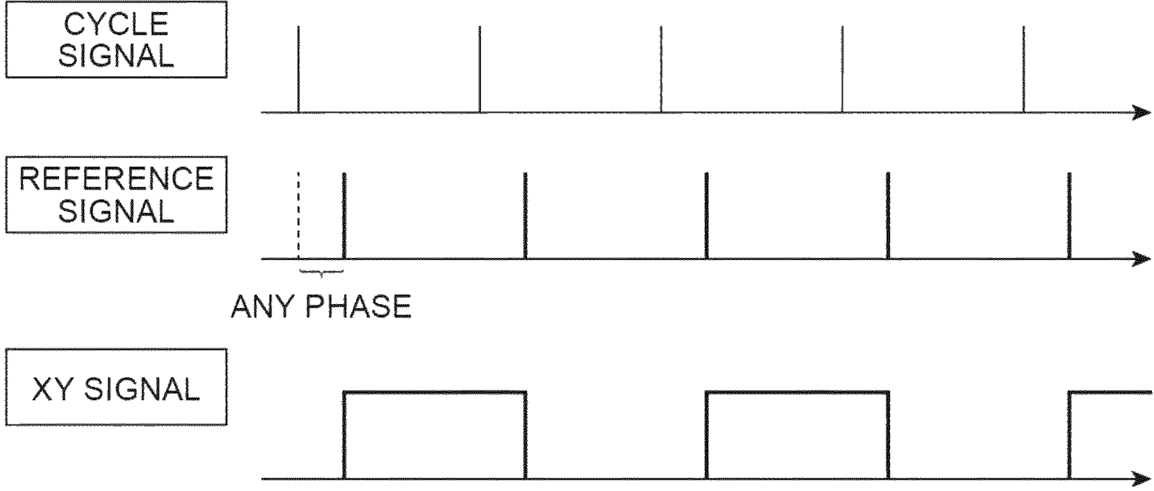
FIG. 10 is a diagram for describing a signal for use in a calibration process.

FIG. 10 shows a signal for use in the calibration process inside of the FPGA of the cancel circuit 60. The cycle signal shown in FIG. 10 is a clock signal for marking a cycle in accordance with the frequency of the DDS as described above. The reference signal is a signal having the same frequency as the cycle signal in any phase from the cycle signal (the phase has been shifted with respect to the cycle signal) and is a trigger for an XY signal to be described below. The XY signal is a lock-in switch signal described above and is a signal produced using the reference signal as a trigger. An X signal (a first signal) is a signal having no phase difference with respect to the reference signal. A Y signal (a second signal) is a signal having a phase shifted by 90 degrees with respect to the reference signal. Actually, the cancel circuit 60 further generates an X' signal (a third signal) obtained by inverting the X signal and a Y' signal (a fourth signal) obtained by inverting the Y signal in addition to the X signal and the Y signal. Each of the X signal, the Y signal, the X' signal, and the Y' signal is generated by the independently dedicated circuit. That is, a process of adjusting the phase of a switch signal such that the voltage value of a signal component corresponding to scattered light corresponds to the slash level is a process of continuously shifting the phase of the reference signal with respect to the cycle signal until the output from the cancel circuit 60 becomes 0 V (or a value close to 0).

FIG. 11 is a diagram for describing a process of performing adjustment such that the output becomes 0 V by shifting the phase of the reference signal with respect to the cycle signal. Here, it is assumed that relationships between the phases of the cycle signal, the reference signal, and the switch signal in the initial state are in the state shown in FIG. 11(*a*). It is assumed that an integral process is performed for the hatching section in FIG. 11 on the basis of the switch signal and an output (a voltage value of a signal component corresponding to scattered light) does not have the slash level and has a positive value. In this case, as shown in FIG. 11(*b*), the phase of the reference signal is adjusted such that the phase of the switch signal is delayed. That is, in the calibration process, the cancel circuit 60 performs adjustment such that the phase of the switch signal is delayed when the voltage value of a signal component corresponding to scattered light does not have the slash level and has a positive value.

Here, it is assumed that an output (a voltage value of a signal component corresponding to scattered light) does not have the slash level and has a positive value as a result of an integral process for the hatching section even in the state of FIG. 11(*b*) in which the phase of the switch signal is adjusted. In this case, as shown in FIG. 11(*c*), the phase of the reference signal is adjusted such that the phase of the switch signal is further delayed.

Here, it is assumed that an output (a voltage value of a signal component corresponding to scattered light) does not have the slash level and has a positive value as a result of an integral process for the hatching section even in the state of FIG. 11(*c*) in which the phase of the switch signal is adjusted. In this case, as shown in FIG. 11(*d*), the phase of the reference signal is further adjusted such that the phase of the switch signal is delayed.

Here, it is assumed that an output (a voltage value of a signal component corresponding to scattered light) does not have the slash level and has a negative value as a result of an integral process for the hatching section in the state of FIG. 11(*d*) in which the phase of the switch signal is adjusted. In this case, as shown in FIG. 11(*e*), the phase of the reference signal is adjusted such that the phase of the switch signal is advanced. That is, in the calibration process, the cancel circuit 60 performs adjustment such that the phase of the switch signal is advanced when the voltage value of a signal component corresponding to scattered light does not have the slash level and has a negative value.

As a result of performing adjustment such that the phase of the switch signal is advanced, as shown in FIG. 11(*e*), when an output (a voltage value of a signal component corresponding to scattered light) has the slash level (a value within a prescribed range close to zero) as a result of an integral process for the hatching section, the calibration process is completed.

When the calibration process is completed, the cancel circuit 60 removes a signal component corresponding to the scattered light component from the detection signal when a detection signal corresponding to detection light including the fluorescence component and the scattered light component (the excitation light component) and the switch signal having the phase adjusted in the calibration process are input.

FIG. 13 is a flowchart showing the calibration process. As shown in FIG. 13, in the calibration process, initially, an input to an AD converter is switched to a prescribed offset voltage and a zero level is stored (step S11). A signal of the cancel circuit 60 (the lock-in circuit) is input to the AD converter in a switching process of the switch (step S12). In this state, the phase of the reference signal is forcibly shifted temporarily (step S13). An output of the cancel circuit 60 (the lock-in circuit) becomes 0 V when the phase of the reference signal with respect to the cycle signal becomes zero degrees and 180 degrees. However, when the phase is incidentally adjusted to 180 degrees in the initial state, an output signal may not be detected according to a configuration of a subsequent-stage circuit because the calibration process may be erroneously completed and the positive/negative sign of the output signal may be inverted. In this regard, the calibration process can be prevented from being erroneously completed by forcibly shifting the phase of the reference signal at the time of the start. Also, the positive/negative sign of the output signal is fixed by adjusting the phase at the time of the start in this way. As a result, there is no need to have a sign bit when an output signal is converted into a digital value and the dynamic range of the AD converter can be effectively used. Also, when it is desired to perform measurement with a negative output, the phase at the completion of the calibration process may be set to 180 degrees instead of zero degrees.

When step S13 is completed, a current input value of the AD converter is recorded (step S14) and a calibration loop process is executed. First, the current input value of the AD converter is compared with a zero level and it is determined whether or not the input value of the AD converter is less than the zero level (whether or not the input value of the AD converter is a negative value) (step S15). When it is determined that the input value of the AD converter is a negative value in step S15, the phase of the switch signal (i.e., a reference signal) of the cancel circuit 60 with respect to the cycle signal corresponding to the frequency of the DDS is advanced (step S16). On the other hand, when it is determined that the input value of the AD converter is a positive value in step S15, the phase of the switch signal (i.e., the reference signal) of the cancel circuit 60 with respect to the cycle signal is delayed (step S17).

It is determined whether or not the level of the input value of the AD converter has become the slash level in a state in which the sign is not changed (step S18). When it is determined that the level has become the slash level in a state in which the sign is not changed in step S18, the calibration process ends. On the other hand, when it is determined that a condition is not satisfied in step S18, it is determined whether or not the sign of the input of the AD converter has changed by shifting the phase (step S19). When it is determined that the sign has not changed in step S19, the processing of step S14 is performed again. When it is determined that the sign has changed, the change range of the phase according to control is changed to half the current range (step S20) and the processing of step S14 is performed again. Hereinabove, the calibration process has been described.

In the present mode, the calibration process of detecting the light for the calibration process, which does not include fluorescence and includes scattered light, and removing a signal component corresponding to the scattered light from a detection signal on the basis of the calibration signal corresponding to the light for the calibration process is performed and the signal component corresponding to the scattered light is removed from a detection signal in consideration of a result of performing the calibration process. The signal component corresponding to the scattered light can be appropriately removed from the detection signal by performing the calibration process for removing the signal component corresponding to the scattered light from the detection signal in advance on the basis of the light for the calibration process including the scattered light.

In this way, effects of appropriately removing scattered light (noise) will be described with reference to FIG. 14. FIG. 14(*a*) shows an intensity of detection light when a signal component (noise) corresponding to scattered light is not removed and FIG. 14(*b*) shows an intensity of detection light when a signal component (noise) corresponding to scattered light is removed. FIG. 14 shows results when a membrane coated with DTBTA-Eu3+ as the fluorescent reagent is measured. As shown in FIG. 14(*a*), when noise is not removed, an offset of approximately 330 counts is required for the background (BKG) of excitation light (scattered light). Noise (standard deviation) is 2.16 and the signal intensity is 404 counts. On the other hand, as shown in FIG. 14(*b*), when noise is removed, offset is not required in consideration of the fact that excitation light is scattered to the membrane and only necessary minimum offset is performed for a software process (a process of setting all signal values to positive values). Noise (standard deviation) can be set to 0.69 and the signal intensity can be set to 1,475 counts. In this way, because the amount of offset is small when noise is removed, the intensity of excitation light from the light source and the amplification factor for the IV conversion amplifier can be increased and the signal intensity can be favorably increased. As a result, S/N becomes 187 when noise is not removed, whereas S/N can become 2,140 when noise is removed, and S/N can be improved by a factor of 10 or more.

In the calibration process, a lock-in switch signal having a phase shifted with respect to a cycle signal for marking a cycle at the operation frequency of the cancel circuit 60 adjusted to the modulated frequency of the light source 11 may be generated, a signal component corresponding to scattered light may be output when the calibration signal and the switch signal are input, the phase of the switch signal may be adjusted within a prescribed range in which the voltage value of a signal component corresponding to the scattered light is close to zero, and a signal component corresponding to scattered light may be removed from a detection signal when the detection signal and the switch signal having the phase adjusted in calibration process are input. In this way, when the phase of a switch signal is adjusted using the lock-in circuit such that the voltage value of a signal component corresponding to the scattered light becomes a value close to zero in the calibration process, a signal component corresponding to scattered light can be appropriately removed from a detection signal when the switch signal after phase adjustment is input.

In the calibration process, the phase of the switch signal may be adjusted such that the phase is delayed when the voltage value of a signal component corresponding to scattered light is not within the prescribed range but is larger than a value within the prescribed range and the phase of the switch signal may be adjusted such that the phase is advanced when the voltage value of a signal component corresponding to scattered light is not within the prescribed range but is smaller than a value within the prescribed range. Thereby, the voltage value of the signal component corresponding to the scattered light can be appropriately adjusted to a value close to zero in the calibration process.

The modulated frequency of the light source 11 may be set such that it is less than a value corresponding to the fluorescence lifespan that is a period of time taken until the intensity of fluorescence drops from the peak value to 1/e. When the modulated frequency has been increased to a value approximately corresponding to the fluorescence lifespan, consecutive signals may overlap each other and the intensity of fluorescence cannot be maximized. In this regard, the modulated frequency is less than a value corresponding to the fluorescence lifespan and therefore the intensity of fluorescence can be appropriately increased.

The modulated frequency of the light source 11 may be less than a value corresponding to the fluorescence lifespan and higher than a commercial frequency. Thereby, the modulated frequency is greater than a value corresponding to the fluorescence lifespan and it is possible to avoid an increase in noise while avoiding a decrease in the intensity of the fluorescence.

As the lock-in switch signals, the X signal, the Y signal having a phase shifted by 90 degrees with respect to the X signal, the X' signal obtained by inverting the X signal, and the Y' signal obtained by inverting the Y signal may be generated using independently dedicated circuits. Because inverted signals are generated using independently dedicated circuits, it is possible to prevent the occurrence of a minute delay which may become a problem when the inverted signals are generated, for example, using a NOT circuit (a minute delay caused when the signal passes through the NOT circuit).

The cancel circuit 60 (the lock-in circuit) may be set by switching between two types of operation frequencies at a prescribed proportion. Thereby, compared to a case in which one type of operation frequency is provided, the operation frequency of the lock-in circuit is easily adjusted to the modulated frequency of the light source 11 and a synchronization system thereof can be improved.

The light for the calibration process may be detected by irradiating a region on the downstream side of the capture antibody fixed to the measurement target portion 504 in the sample 500 with excitation light. Because a fluorescence component is likely to stay on the upstream side of the capture antibody, the light for the calibration process in which an influence of the fluorescence component is reduced can be appropriately detected by irradiating the region on the downstream side of the capture antibody with excitation light and detecting the light for the calibration process.

Next, specific modes (first to third modes) of the calibration process in the above-described fluorescence measurement will be described with reference to FIGS. 15 to 29. In the modes, calibration processing methods are different from each other. Specifically, in the first mode, the calibration process is performed by irradiating the reference member with the irradiation light and detecting light for the calibration process. In the second mode, the calibration process is performed by the detection optical system directly detecting the irradiation light as the light for the calibration process. In the third mode, the calibration process is performed by generating a calibration signal which is a pseudo signal. The optical measurement device 1 of the first mode (see FIG. 1) (having the above-described configuration), an optical measurement device 701 of the second mode (see FIG. 23), and an optical measurement device 801 of the third mode (see FIG. 27) partially have different configurations. Hereinafter, the modes will be described in detail.

[First Mode]

FIG. 15 is a diagram for describing a fluorescence measurement procedure of the first mode. As shown in FIG. 15(*a*), in the fluorescence measurement of the first mode, initially, the light source 11 of the irradiation optical system 10 irradiates the reference member 600 for the calibration process different from the sample 500 which is the measurement target object with the irradiation light and the photodetection element 21 of the detection optical system 20 detects the light for the calibration process including the scattered light associated with the irradiation light from the reference member 600 irradiated with the irradiation light. The cancel circuit 60 (see FIG. 1), which is the signal processing unit, performs the calibration process on the basis of the calibration signal corresponding to the light for the calibration process. The above is the first process in the first mode.

Subsequently, as shown in FIG. 15(*b*), the light source 11 irradiates the sample 500, which is the measurement target object, with excitation light (irradiation light) and the photodetection element 21 detects measurement target light including fluorescence generated from the sample 500 irradiated with the excitation light and scattered light associated with the excitation light from the sample 500 irradiated with the excitation light. The cancel circuit 60 (see FIG. 1), which is the signal processing unit, removes a signal component corresponding to the scattered light from a measurement signal corresponding to the measurement target light in consideration of a result of performing the calibration process. The above is the second process in the first mode. When FIGS. 15(*a*) and 15(*b*) are front views and FIG. 15(*c*) is a right-side view. As shown in FIG. 15(*c*), when the fluorescence from the sample 500 is acquired, the measurement region of the sample 500 is scanned by the optical head of the irradiation optical system 10 and therefore fluorescence information of the measurement target portion 504 of the sample 500 is acquired.

Figure 18:
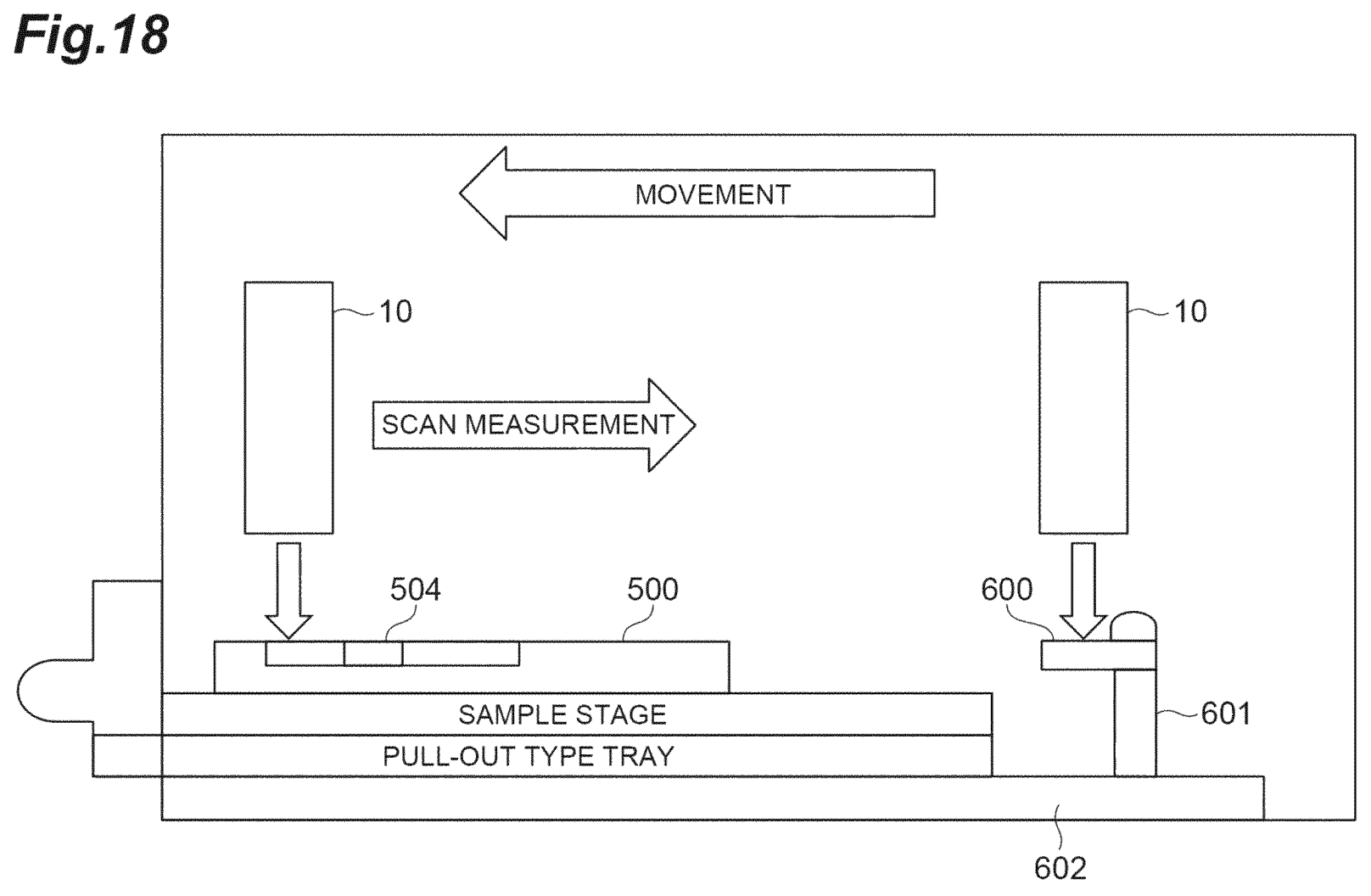

This fluorescence measurement is implemented by the configuration shown in FIG. 18 in more detail. That is, when the calibration process is initially performed, the optical head of the irradiation optical system 10 is disposed such that the reference member 600 fixed to a position different from that of the sample 500 placed on the sample stage, specifically, a fixing portion 601 extending substantially vertically from a fixing portion 602, is irradiated with the irradiation light. When the calibration process is completed, the optical head of the irradiation optical system 10 moves such that the sample 500 is irradiated with the excitation light (irradiation light) and the optical head of the irradiation optical system 10 performs a scan operation such that the fluorescence information of the measurement target portion 504 of the sample 500 is acquired.

Here, preferably, the reference member 600 in the first mode is a member that reflects the irradiation light and does not generate fluorescence on its own according to the radiation of the irradiation light. Also, in the present application, the fact that fluorescence is not generated according to the radiation of the irradiation light indicates that fluorescence caused by the reference member 600 is not generated even according to the radiation of the irradiation light or only negligible fluorescence is generated. On the other hand, FIG. 16 is a diagram for describing the effects of calibration when a reference member that generates fluorescence is used, wherein FIG. 16(*a*) shows light for the calibration process including fluorescence detected when a reference member is irradiated with irradiation light and FIG. 16(*b*) shows a result of fluorescence measurement of the sample 500 based on the calibration result related to the light for the calibration process shown in FIG. 16(*a*). In FIG. 16(*a*), the horizontal axis represents a wavelength and the vertical axis represents a light intensity and a shortest wavelength that can be detected by a photodetector (the photodetection element 21) is indicated by a broken line. In FIG. 16(*b*), the horizontal axis represents a channel and the vertical axis represents a light intensity. In FIG. 16(*a*), a case in which, when a reference member that generates certain fluorescence is excited by irradiation light of 380 nm, fluorescence of a wavelength that can be detected by the photodetection element 21, specifically, fluorescence of about 600 to 850 nm, is detected is shown. In this way, when the reference member that generates fluorescence is irradiated with the irradiation light, the photodetection element 21 detects not only the scattered light (irradiation light) but also the fluorescence from the reference member. That is, the photodetection element 21 detects the light for the calibration process including the fluorescence. In a case in which the calibration process is performed on the basis of the light for the calibration process including the fluorescence, when the phase of the switch signal is adjusted such that the voltage value of the output of the device becomes 0 using the calibration signal, the phase of the switch signal is adjusted to the phase affected by the fluorescence component (locked in to the phase of the fluorescence component). Thereby, as shown in FIG. 16(*b*), when the fluorescence measurement of the sample 500 is performed in consideration of the calibration result, there is a possibility that a fluorescence waveform from the sample 500 cannot be obtained due to an influence that a switch signal is adjusted such that the fluorescence component from the reference member is removed (canceled) during the calibration process. In FIG. 16(*b*), an example in which a waveform of fluorescence from the sample 500 cannot be obtained in any channel is shown.

FIG. 17 is a diagram for describing the effects of calibration when a reference member that does not generate fluorescence is used, wherein FIG. 17(*a*) shows light for the calibration process detected when a reference member is irradiated with irradiation light and FIG. 17(*b*) shows a result of fluorescence measurement of the sample 500 based on a calibration result related to the light for the calibration process shown in FIG. 17(*a*). In FIG. 17(*a*), the horizontal axis represents a wavelength and the vertical axis represents a light intensity and a shortest wavelength that can be detected by a photodetector (the photodetection element 21) is indicated by a broken line. In FIG. 17(*b*), the horizontal axis represents a channel and the vertical axis represents a light intensity. In FIG. 17(*a*), a case in which, when a reference member that does not generate certain fluorescence is irradiated with irradiation light of 380 nm, fluorescence is not detected (or only a negligibly small amount of fluorescence is detected) is shown. In this way, when the light for the calibration process does not include fluorescence but substantially includes only scattered light, it is possible to appropriately acquire a waveform of fluorescence from the sample 500 because only a signal component corresponding to light scattered from the sample 500 is removed (canceled) if the fluorescence measurement on the sample 500 is performed in consideration of the calibration result as shown in FIG. 17(*b*). From the above, it can be said that the reference member 600 is preferably a member that does not generate fluorescence on its own.

Figure 19:
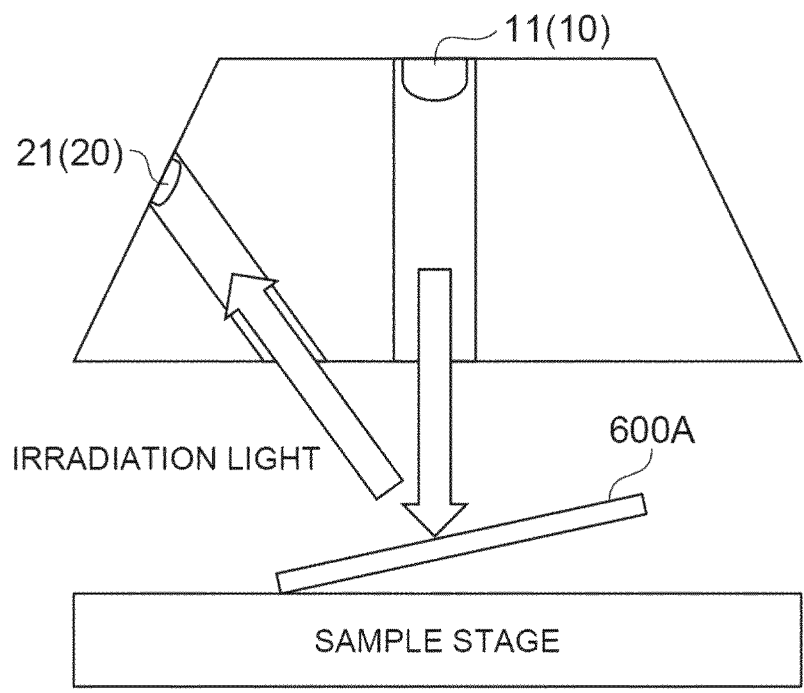
FIG. 19 is a diagram for describing the acquisition of scattered light when a mirror is used for the reference member.

Subsequently, as an example of the reference member 600, each example shown in FIGS. 19 to 21 will be described. FIG. 19 is a diagram for describing the acquisition of scattered light when the mirror 600A is used for the reference member 600. As shown in FIG. 19, the reference member 600 may include the mirror 600A. The mirror 600A may be any mirror as long as it can reflect the irradiation light, but more preferably, the mirror 600A is formed of a material that does not generate fluorescence by irradiation with the irradiation light (or does not generate fluorescence caused by the mirror 600A or generates only negligible fluorescence). The mirror 600A may be, for example, a mirror whose surface is not easily dirty. The mirror 600A reflects the irradiation light radiated from the light source 11. The tilt angle of the mirror 600A is adjusted such that the reflected irradiation light (scattered light) is detected by the photodetection element 21. The mirror 600A is fixed to a prescribed tilt angle by an adjustment mechanism (not shown). By appropriately adjusting the tilt angle of the mirror 600A with respect to the photodetection element 21, the intensity of light detected by the photodetection element 21 can be increased.

Figure 20:
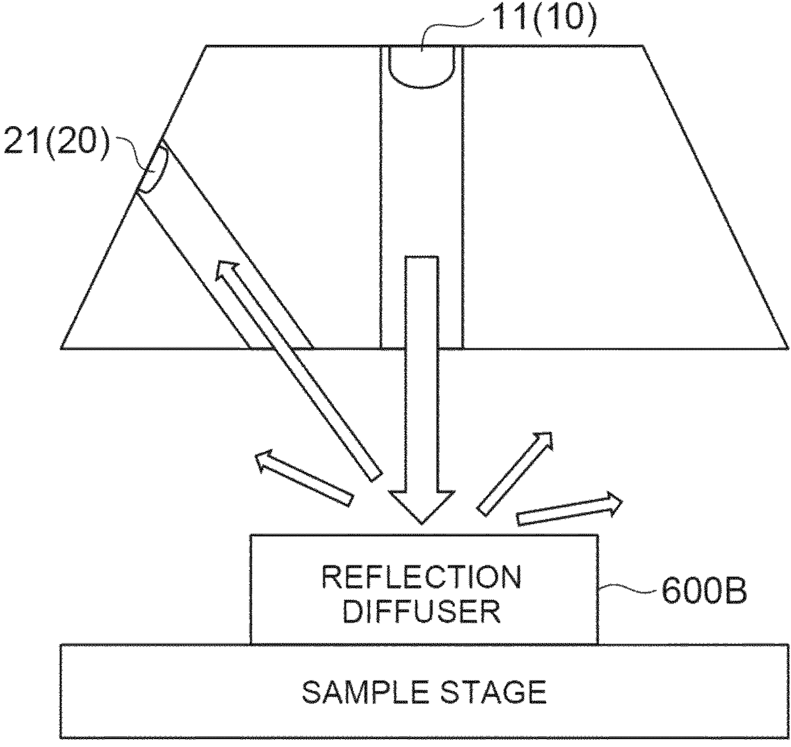
FIG. 20 is a diagram for describing the acquisition of scattered light when a reflection diffuser is used for the reference member.

FIG. 20 is a diagram for describing the acquisition of scattered light when a reflection diffuser 600B is used for the reference member 600. As shown in FIG. 20, the reference member 600 may include the reflection diffuser 600B. The reflection diffuser 600B is, for example, a reflection diffusion plate including a white member which is a member made of a material that does not generate fluorescence due to radiation of the irradiation light on its own (or that does not generate fluorescence due to the reflection diffuser 600B or generates only negligible fluorescence) and in which an intensity of light incident on the photodetection element 21 is relatively stable. The reflection diffuser 600B reflects the irradiation light radiated from the light source 11 such that the irradiation light is diffused at various angles. The reflection diffuser 600B is disposed at a position where the reflected irradiation light (scattered light) is detected by the photodetection element 21 with a large intensity of light. The reflection diffuser 600B is preferably an integrally molded member made of, for example, resin or ceramic, but may be formed in, for example, a cutting process, a combination of a plurality of members, or the like, or configured by providing a film or the like capable of scattering irradiation light at a specific angle on the surface of the plate-shaped member.

Figure 21:
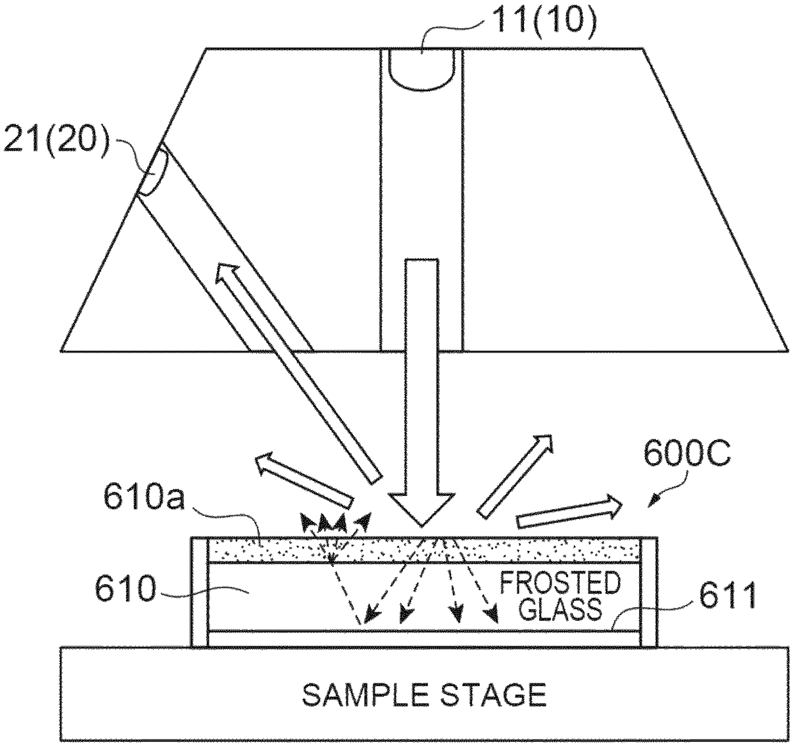
FIG. 21 is a diagram for describing the acquisition of scattered light when frosted glass is used for the reference member.

FIG. 21 is a diagram for describing the acquisition of scattered light when a mirror 611 (a reflection base material) and a frosted glass 610 (a diffuser) are used for the reference member 600. As shown in FIG. 21, the reference member 600 may include a reference member 600C including a frosted glass 610 that is a glass member that transmits irradiation light and a mirror 611 that reflects the irradiation light. In the reference member 600C, the frosted glass 610 is provided to be supported (laminated) on the mirror 611 and is provided such that the irradiation light is incident in front of the mirror 611. The frosted glass 610 is made of, for example, a material that transmits irradiation light of 380 nm or more and a projection/recess portion 610*a* of a projection/recess shape is formed on a surface (an incident surface of the irradiation light). Alternatively, a film or the like capable of scattering the irradiation light at a specific angle may be provided on the surface of the frosted glass 610. It is only necessary for the mirror 611 to be any one that reflects the irradiation light. For example, the mirror 611 may be a plate-shaped metal member made of aluminum or the like, a plate-shaped member whose surface is covered with a metal film such as aluminum, or a box-shaped member configured to accommodate the frosted glass 610. Also, more preferably, both the mirror 611 and the frosted glass 610 are formed of a material that does not generate fluorescence according to irradiation with irradiation light (the fluorescence caused by the mirror 611 and the frosted glass 610 is not generated or only negligible fluorescence is generated). As shown in FIG. 21, in the reference member 600C, the irradiation light incident on the frosted glass 610 is diffused in the projection/recess portion 610*a*, is transmitted through the inside of the frosted glass 610, reaches the mirror 611, is reflected by the mirror 611, is transmitted through the inside of the frosted glass 610 again, reaches the surface of the frosted glass 610, and is diffused and emitted in various directions in the projection/recess portion 610*a* (scattered light is generated at various angles). By generating scattered light at various angles, scattered light having a sufficient light intensity is detected by the photodetection element 21. In the reference member 600C, a reflection material having a roughened surface may be used. In this case, a roughened surface portion of the surface of the reflection material corresponds to a diffuser that diffuses the irradiation light.

Figure 22:
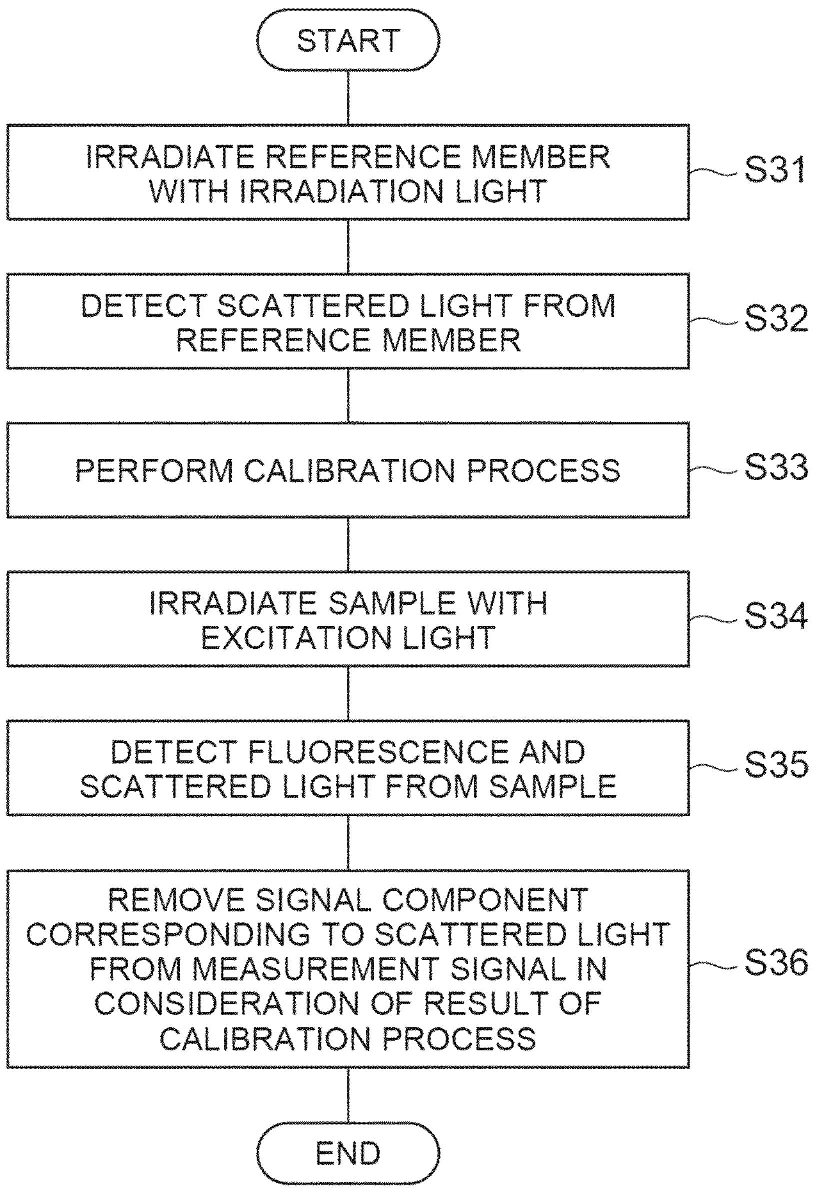
FIG. 22 is a flowchart showing a fluorescence measurement process of the first mode.

Next, the fluorescence measurement process of the first mode will be described with reference to FIG. 22. FIG. 22 is a flowchart showing the fluorescence measurement process of the first mode. As shown in FIG. 22, in the fluorescence measurement process of the first mode, initially, the optical head of the irradiation optical system 10 is disposed such that the reference member 600 for the calibration process different from the sample 500 is irradiated with irradiation light (step S31; see FIG. 15(*a*)). The light for the calibration process including the scattered light associated with the irradiation light from the reference member 600 irradiated with the irradiation light is detected by the photodetection element 21 (step S32; see FIG. 15(*a*)). In the cancel circuit 60, a calibration process for removing the signal component corresponding to the scattered light from the detection signal is performed on the basis of the calibration signal corresponding to the light for the calibration process (step S33). Details of the calibration process are as described above with reference to FIGS. 10 to 13 and the like and description thereof will be omitted.

Subsequently, the optical head of the irradiation optical system 10 operates to scan the measurement area region of the sample 500 and the measurement target portion 504 of the sample 500 is irradiated with the excitation light (irradiation light) (step S34; see FIG. 15(*c*)) and therefore the photodetection element 21 detects measurement target light including fluorescence generated from the sample 500 irradiated with the excitation light and scattered light associated with the excitation light from the sample 500 irradiated with the excitation light (step S35; see FIG. 15(*b*)). In the cancel circuit 60, the signal component corresponding to the scattered light is removed from the measurement signal corresponding to the above-described measurement target light on the basis of a result of performing the calibration process of step S33 (step S36). Specifically, as described above, the cancel circuit 60 removes the signal component corresponding to the scattered light from the measurement signal when the measurement signal and the switch signal whose phase has been adjusted in the calibration process are input.

Next, the operation and effects according to the first mode will be described.

The optical measurement device 1 according to the first mode includes the irradiation optical system 10 configured to irradiate an irradiation target with irradiation light (excitation light); the detection optical system 20 configured to detect detection light caused by the irradiation light (excitation light); and the cancel circuit 60 configured to process a detection signal corresponding to the detection light. In the optical measurement device 1, in a first process, the irradiation optical system 10 designates the reference member 600 for a calibration process different from the sample 500 as the irradiation target and irradiates the reference member 600 with the irradiation light (see FIG. 15(*a*)), the detection optical system 20 detects light for the calibration process as the detection light, wherein the light for the calibration process includes scattered light associated with the irradiation light from the reference member 600 irradiated with the irradiation light (see FIG. 15(*a*)), and the cancel circuit 60 designates a calibration signal corresponding to the light for the calibration process as the detection signal and performs the calibration process for removing a signal component corresponding to the scattered light from the detection signal in a second process to be described below on the basis of the calibration signal. Also, in the optical measurement device 1, in the second process, the irradiation optical system 10 designates the sample 500 as the irradiation target and irradiates the sample 500 with the excitation light (the irradiation light) (see FIG. 15(*b*)), the detection optical system 20 configured to detect measurement target light as the detection light, wherein the measurement target light includes fluorescence generated from the sample 500 irradiated with the excitation light and light scattered from the sample 500 irradiated with the excitation light (see FIG. 15(*b*)), and the cancel circuit 60 designates a measurement signal corresponding to the measurement target light as the detection signal and removes a signal component corresponding to the scattered light in the calibration process during the first process from the measurement signal.

In this way, in the optical measurement device 1, in the first process related to the calibration process, the reference member 600 different from the sample 500 is irradiated with the irradiation light and the light for the calibration process including the scattered light is detected. Thereby, for example, it is possible to detect light for the calibration process that does not include the fluorescence (or includes only negligible fluorescence) by providing the reference member 600 that does not generate fluorescence (or generates only negligible fluorescence) according to radiation of the irradiation light. Thereby, in the second process, it is possible to remove a noise component caused by the irradiation light itself and perform fluorescence measurement with high accuracy by removing only the signal component corresponding to the scattered light from the measurement signal appropriately on the basis of the result of performing the calibration process. Also, the reference member 600 for the calibration process, which is different from the sample 500 (the actual sample), is used, such that a problematic variation in a result of the calibration process corresponding to characteristics of the actual sample (characteristics determined due to a difference in a movement speed or the like of a fluorescent substance), for example, when the actual sample is irradiated with irradiation light to detect the light for the calibration process, does not occur. More specifically, the actual sample may have a variation in characteristics due to, for example, a difference between production lots, and, for example, a difference in the movement speed of the fluorescent substance or the like may occur. In this case, amounts of fluorescent substance (i.e., amounts of fluorescence emission) in region areas to be irradiated with the irradiation light during the calibration process are likely to be different from each other according to each actual sample. Thereby, the result of the calibration process may not be stable and, for example, sufficient reliability may not be obtained for determining the result of the optical measurement. However, the fluorescence measurement can be performed with higher accuracy using the reference member 600. Although it is difficult to set a threshold value for making the positive/negative determination in measurement using, for example, an immuno-chromatography method, when the result output by the device differs in accordance with a difference in the characteristics of each actual sample, it is possible to limit such a problem when the calibration is performed using the reference member 600. Also, for example, even if a plurality of samples 500 having different shapes (for example, a plurality of immuno-chromatography test piece reagent kits individually corresponding to various types of antigens) are measured by one optical measurement device 1, it is possible to simplify a control process on the hard side and a control process on the soft side because it is not necessary to set an appropriate calibration region for each sample 500 and it is possible to perform the calibration process using one reference member 600. Also, for example, as compared with the case in which the actual sample is irradiated with the irradiation light and the light for the calibration process is detected, it is not necessary to significantly change the configuration of the optical measurement device 1 itself, such that this mode is superior in terms of cost-effectiveness. Also, because the calibration process is performed from an actually measured value, the accuracy of the calibration process can be ensured in this mode (accurate phase adjustment can be performed in the calibration process). In this way, the optical measurement device 1 according to the present mode can perform the calibration process more appropriately, remove the noise component caused by the irradiation light itself by removing the noise component caused by the irradiation light itself more appropriately, and perform the fluorescence measurement with high accuracy.

The reference member 600 may include a reflection member (the mirror 600A, the mirror 611, or the reflection diffuser 600B) that reflects the irradiation light as shown in FIGS. 19 to 21. According to this configuration, the intensity of detection light can be easily increased. Further, preferably, the reflection member does not generate fluorescence according to irradiation with irradiation light. According to this configuration, even if the irradiation light is radiated, fluorescence caused by the reflection member is not generated (or only negligible fluorescence is generated), such that only the signal component corresponding to the scattered light component from the measurement signal can be reliably removed in the second process.

As shown in FIG. 20, the reference member 600 may include the reflection diffuser 600B that diffuses the irradiation light. According to this configuration, the reflection diffuser 600B can easily generate the scattered light at various angles and the intensity of the detection light can be increased more easily. Also, in this configuration, because the reference member can have a simple configuration, it is advantageous in terms of workability and cost.

As shown in FIG. 21, the reference member 600 may include a mirror 611 that reflects the irradiation light and a frosted glass 610 that is supported by the mirror 611 and diffuses the irradiation light. According to this configuration, the intensity of the detection light can be increased more easily by the mirror 611 and the frosted glass 610 in cooperation. Because the projection/recess portion 610*a* is formed on the surface of the frosted glass 610, scattered light can be easily generated at various angles and the intensity of the detection light can be increased more easily.

The reference member 600 may include a mirror as shown in FIG. 19. According to this configuration, the intensity of the detection light can be increased more easily by adjusting the reflection angle of the mirror with respect to the photodetection element 21.

[Second Mode]

Figure 23:
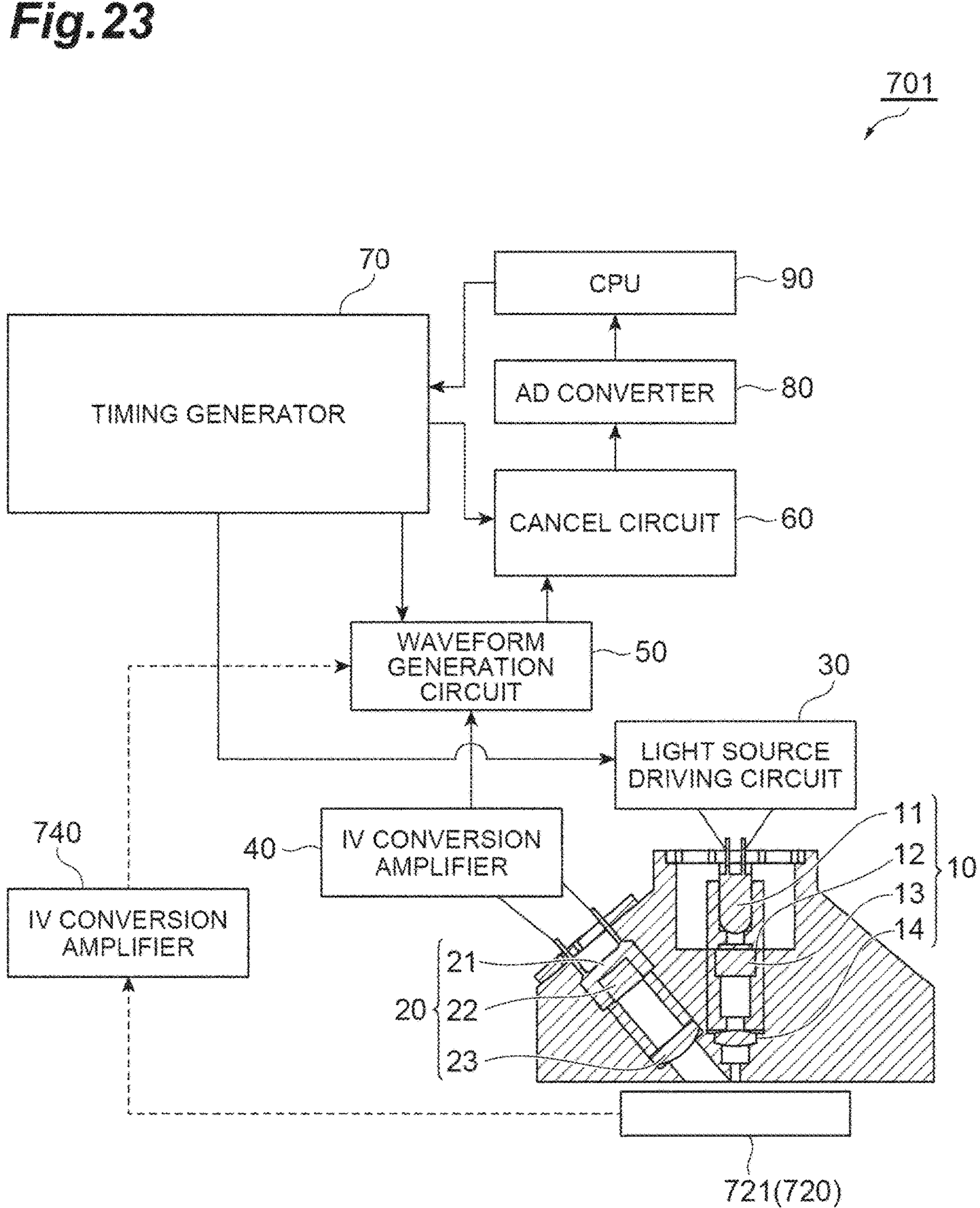
FIG. 23 is a diagram of a schematic configuration of an optical measurement device of a second mode.

FIG. 23 is a diagram of a schematic configuration of an optical measurement device 701 of the second mode. Although the optical measurement device 701 of the second mode has a configuration substantially similar to that of the above-described optical measurement device 1 (see FIG. 1), the optical measurement device 701 is different from the optical measurement device 1 in that a photodetection element 721 of a detection optical system 720 (a first detection optical system) is provided and an IV conversion amplifier 740 is provided as shown in FIG. 23. The photodetection element 721 has a configuration different from that of the photodetection element 21 of the detection optical system 20 (a second detection optical system). Also, the IV conversion amplifier 740 has a configuration different from that of the IV conversion amplifier 40. The photodetection element 721 directly detects the irradiation light (the light for the calibration process) emitted from the irradiation optical system 10 as the detection light as the process related to the calibration process. The photodetection element 721 outputs a detection signal corresponding to the detection light to the IV conversion amplifier 740. The IV conversion amplifier 740 converts a power signal (the detection signal) input from the photodetection element 721 into a voltage signal as a process related to the calibration process. The IV conversion amplifier 740 outputs the detection signal converted into a voltage signal to the waveform generation circuit 50. In this case, the waveform generation circuit 50 generates the waveform of the detection signal on the basis of the detection signal input from the IV conversion amplifier 740 and outputs information of the generated waveform (detection signal) to the cancel circuit 60.

Figure 24:
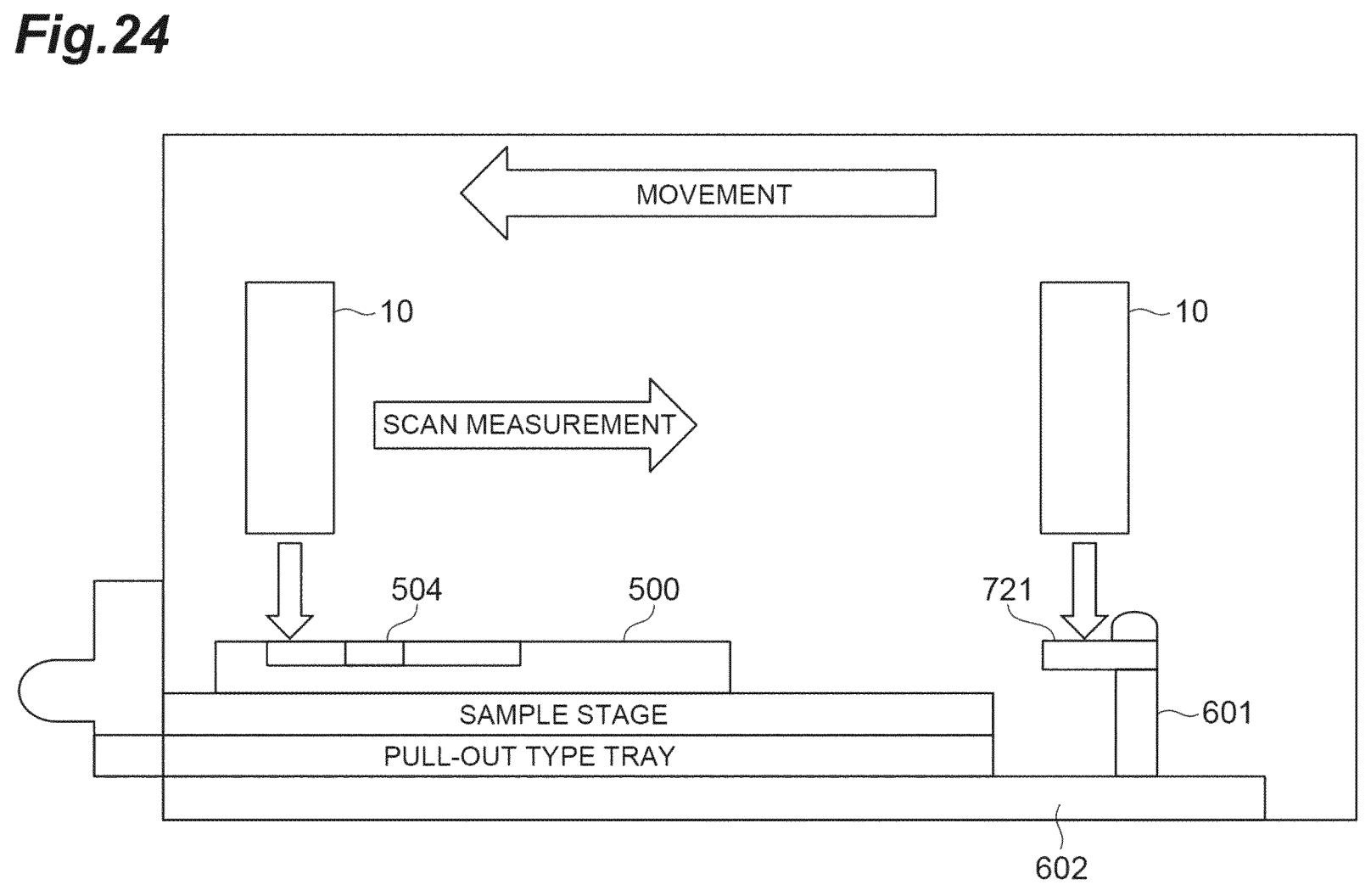

FIG. 24 is a diagram for describing an outline of fluorescence measurement in the second mode. As shown in FIG. 24, in the fluorescence measurement of the second mode, initially, when a calibration process is performed, the optical head of the irradiation optical system 10 is disposed such that the photodetection element 721 fixed to a position different from that of the sample 500 placed on the sample stage, specifically, a fixing portion 601 extending substantially vertically from a fixing portion 602, is irradiated with the irradiation light. By acquiring the irradiation light in this way, the light for the calibration process that is the irradiation light is detected. When the calibration process is completed, the optical head of the irradiation optical system 10 moves such that the sample 500 is irradiated with the excitation light (irradiation light) and the optical head of the irradiation optical system 10 performs a scan operation such that the fluorescence information of the measurement target portion 504 of the sample 500 is acquired.

FIG. 25 is a diagram for describing the acquisition of excitation light of the second mode. As shown in FIG. 25(*a*), in the acquisition of irradiation light of the second mode, the light source 11 of the irradiation optical system 10 irradiates the photodetection element 721 of the detection optical system 720 with the irradiation light. Thereby, the photodetection element 721 directly detects the light for the calibration process that is the irradiation light. The cancel circuit 60, which is a signal processing unit, performs the calibration process on the basis of the calibration signal corresponding to the light for the calibration process. The irradiation light is light having the same phase as the scattered light. Thus, even if the photodetection element 721 detects the irradiation light as the light for the calibration process, the calibration process for removing the signal component corresponding to the scattered light from the detection signal can be appropriately performed. Because the process (the second process) after the calibration process is similar to that of the first mode, description thereof will be omitted.

Figure 26:
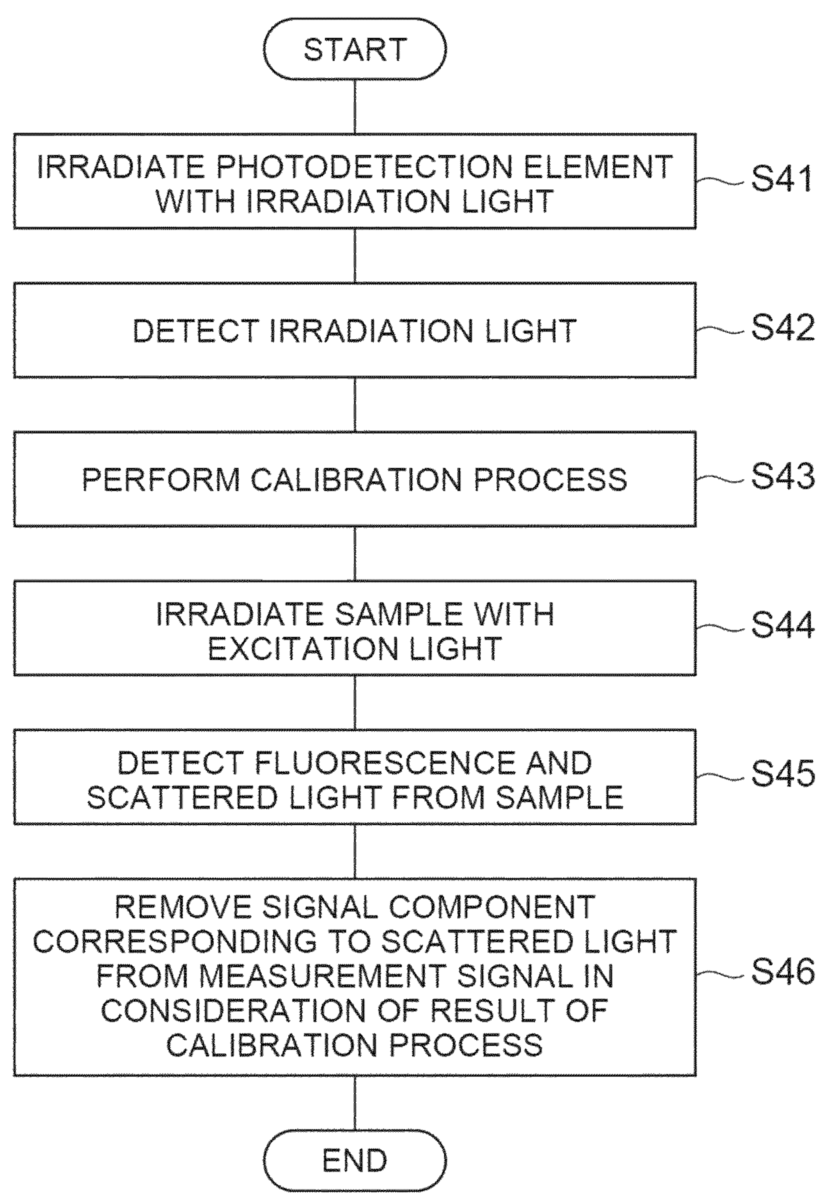
FIG. 26 is a flowchart showing a fluorescence measurement process of the second mode.

Next, the fluorescence measurement process of the second mode will be described with reference to FIG. 26. FIG. 26 is a flowchart showing the fluorescence measurement process of the second mode. As shown in FIG. 26, in the fluorescence measurement process of the second mode, initially, an optical head of the irradiation optical system 10 is disposed such that the photodetection element 721 fixed to a position different from that of the sample 500 is irradiated with irradiation light (step S41; see FIG. 25(*a*)). The light for the calibration process, which is the irradiation light, is detected by the photodetection element 721 (step S42; see FIG. 25(*a*)). The irradiation light is light having the same phase as the scattered light. In the cancel circuit 60, a calibration process for removing the signal component corresponding to the scattered light from the detection signal is performed on the basis of the calibration signal corresponding to the light for the calibration process (step S43). Because details of the calibration process are as described above with reference to FIGS. 10 to 13 and the like, description thereof will be omitted.

Subsequently, the optical head of the irradiation optical system 10 operates to scan the measurement region of the sample 500 and the measurement target portion 504 of the sample 500 is irradiated with the excitation light (irradiation light) (step S44) and therefore the photodetection element 21 detects measurement target light including fluorescence generated from the sample 500 irradiated with the excitation light and scattered light associated with the excitation light from the sample 500 irradiated with the excitation light (step S45). In the cancel circuit 60, the signal component corresponding to the scattered light in the calibration process of step S43 is removed from the measurement signal corresponding to the above-described measurement target light (step S46). Specifically, as described above, the cancel circuit 60 removes the signal component corresponding to the scattered light from the measurement signal when the measurement signal and the switch signal whose phase has been adjusted in the calibration process are input.

Next, the operation and effects according to the second mode will be described.

The optical measurement device 701 (see FIG. 23) according to the second mode includes the irradiation optical system 10 configured to irradiate an irradiation target with irradiation light (excitation light); a photodetection unit including the detection optical system 20 and the detection optical system 720 configured to detect detection light caused by the irradiation light; and the cancel circuit 60 configured to process a detection signal corresponding to the detection light. In the optical measurement device 701, in a first process, the irradiation optical system 10 irradiates the photodetection element 721 of the detection optical system 720 with the irradiation light, the photodetection element 721 detects light for a calibration process, which is the irradiation light, as the detection light (see FIG. 25(*a*)), and the cancel circuit 60 designates a calibration signal corresponding to the light for the calibration process as a detection signal and performs a calibration process for removing a signal component corresponding to scattered light from the detection signal in a second process to be described below on the basis of the calibration signal. Also, in the optical measurement device 701, in the second process, the irradiation optical system 10 irradiates the sample 500 with the excitation light (the irradiation light), the detection optical system 20 detects measurement target light as the detection light, wherein the measurement target light includes fluorescence generated from the sample 500 irradiated with the excitation light and light scattered from the sample 500 irradiated with the excitation light, and the cancel circuit 60 designates a measurement signal corresponding to the measurement target light as the detection signal and removes a signal component corresponding to the scattered light in the calibration process during the first process from the measurement signal.

In this way, in the optical measurement device 701, in the first process related to the calibration process, the photodetection element 721 of the detection optical system 720 is directly irradiated with the irradiation light and the light for the calibration process that is the irradiation light is detected. The irradiation light is light having the same phase as the scattered light. Thus, the detection optical system 720 can appropriately detect the light that does not include fluorescence and has the same phase as the scattered light as the light for the calibration process by detecting the irradiation light as the light for the calibration process. Thereby, in the second process, it is possible to remove a noise component caused by the irradiation light itself and perform fluorescence measurement with high accuracy by removing the signal component corresponding to the scattered light from the measurement signal appropriately on the basis of the result of performing the calibration process. Also, a problematic variation in a result of the calibration process corresponding to characteristics of the sample 500, for example, when the sample 500 is irradiated with irradiation light to detect the light for the calibration process does not occur because the light for the calibration process is detected without irradiating the sample 500 with the irradiation light. More specifically, the actual sample may have a variation in characteristics due to, for example, a difference between production lots, and, for example, a difference in the movement speed of the fluorescent substance or the like may occur. In this case, amounts of fluorescent substances (i.e., amounts of fluorescence emission) in region areas to be irradiated with the irradiation light during the calibration process are likely to be different from each other according to each actual sample. Thereby, the result of the calibration process may not be stable and, for example, sufficient reliability may not be obtained for determining the result of the optical measurement. However, the fluorescence measurement can be performed with higher accuracy because the light for the calibration process is detected without irradiating the sample 500 with the irradiation light. Although it is difficult to set a threshold value for making the positive/negative determination in measurement using, for example, an immuno-chromatography method, when the result output by the device differs in accordance with a difference in the characteristics of each actual sample, it is possible to limit such a problem when the light for the calibration process is detected without irradiating the sample 500 with the irradiation light. Also, for example, even if a plurality of samples 500 having different shapes (for example, a plurality of immuno-chromatography test piece reagent kits individually corresponding to various types of antigens) are measured by one optical measurement device 1, it is possible to simplify a control process on the hard side and a control process on the soft side because it is not necessary to set an appropriate calibration region for each sample 500 and it is possible to detect the light for the calibration process without irradiating the sample 500 with the irradiation light in the calibration process. Also, because the irradiation light is directly detected and used as the light for the calibration process, an intensity of the light for the calibration process can be sufficiently ensured. In this way, the optical measurement device 701 according to the present mode can perform the calibration process more appropriately, remove the noise component caused by the irradiation light itself by removing the noise component caused by the irradiation light itself more appropriately, and perform the fluorescence measurement with high accuracy.

Although a case in which the optical measurement device 701 has the detection optical system 720 that is a first detection optical system and the detection optical system 20 that is a second detection optical system has been described above, the optical measurement device may include one detection optical system 820 that functions as the first detection optical system and the second detection optical system, for example, as shown in FIG. 25(*b*). The detection optical system 820 has a photodetection element 821. In this case, the irradiation optical system includes, for example, the irradiation optical system 910 that irradiates the detection optical system 820 with irradiation light when the detection optical system 820 functions as the first detection optical system (i.e., the detection optical system that detects the irradiation light as the light for the calibration process) and the irradiation optical system 10 that irradiates the sample 500 with the excitation light (irradiation light) when the detection optical system 820 functions as the second detection optical system (i.e., the detection optical system that detects measurement target light including fluorescence and scattered light from sample 500). In this case, both the light source 911 of the irradiation optical system 910 and the light source 11 of the irradiation optical system 10 need to be modulated with respect to the reference signal.

[Third Mode]

Figure 27:
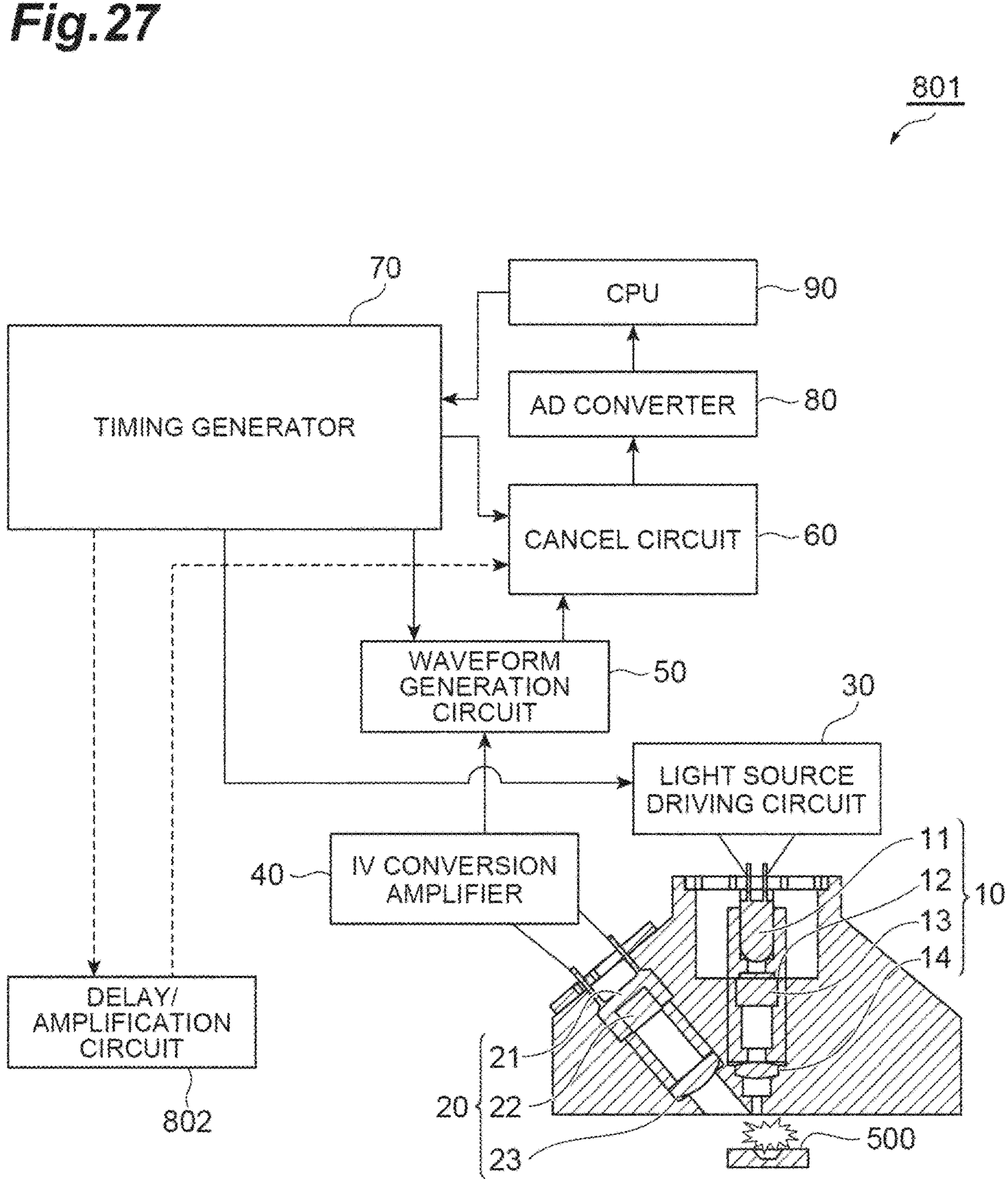
FIG. 27 is a diagram of a schematic configuration of an optical measurement device according to a third mode.

FIG. 27 is a diagram of a schematic configuration of the optical measurement device 801 of the third mode. Although the optical measurement device 801 of the third mode has a configuration substantially similar to that of the above-described optical measurement device 1 (see FIG. 1), the optical measurement device 801 of the third mode is different from the optical measurement device 1 in that a delay/amplification circuit 802 is provided as shown in FIG. 27. The delay/amplification circuit 802 is configured to function as a signal processing unit together with the cancel circuit 60. Here, as described above, the light source driving circuit 30 sets the modulated frequency of the light source 11 on the basis of a reference frequency signal input from the timing generator 70. The delay/amplification circuit 802 generates a pseudo signal (a calibration signal) obtained by changing a phase of a signal of a modulated frequency (a modulated signal) set in the light source 11 from the light source driving circuit 30 on the basis of the frequency signal input from the timing generator 70.

Figure 28:
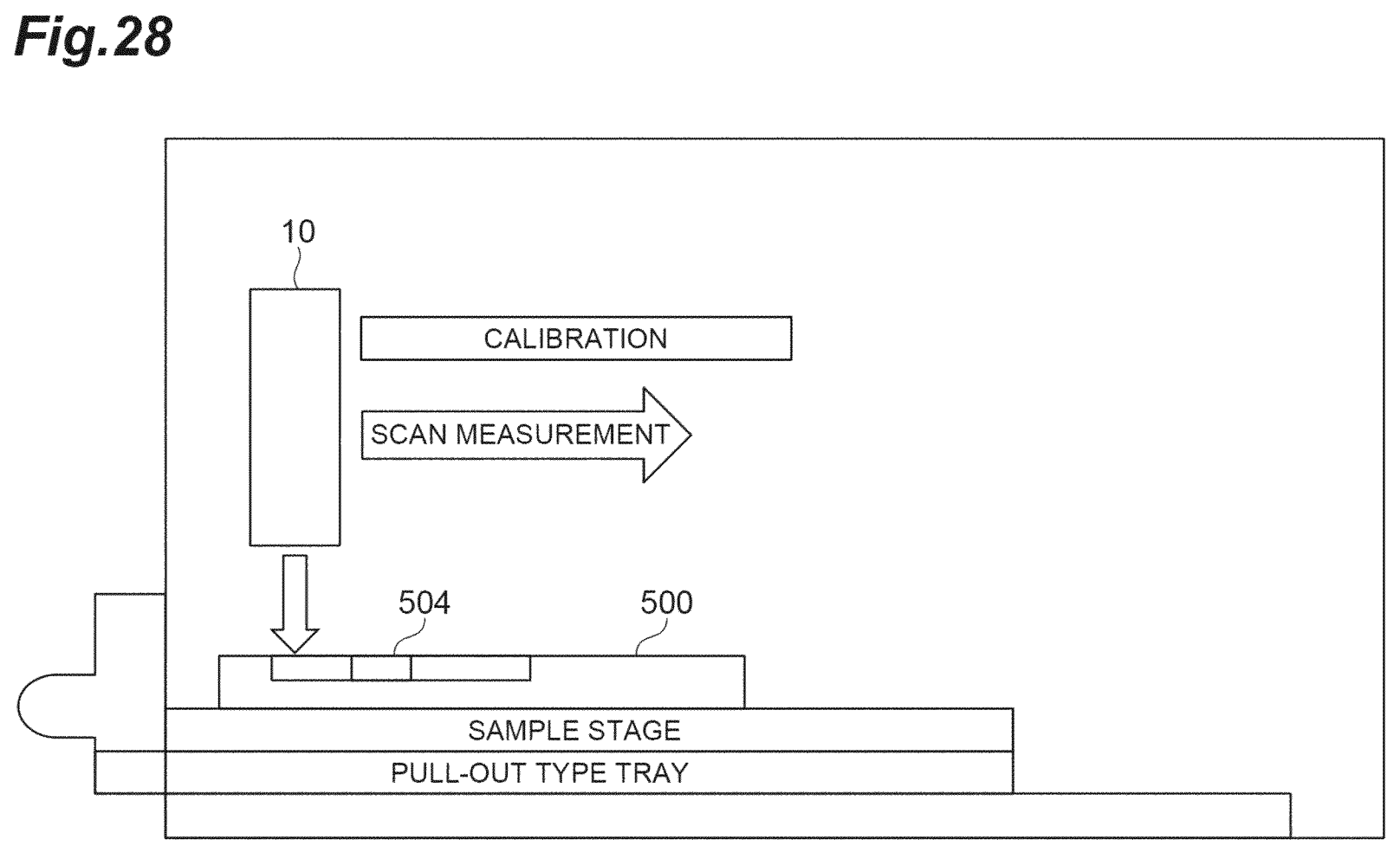

Specifically, the delay/amplification circuit 802 generates a pseudo signal (a calibration signal) obtained by changing the phase of the above-described modulated signal on the basis of a delay corresponding to a period until the scattered light associated with the irradiation light radiated from the light source 11 of the irradiation optical system 10 is detected as the detection light by the detection optical system 20. In this way, the pseudo signal is a signal obtained by simulating the scattered light (the irradiation light) detected by the detection optical system 20 in the calibration process. Further, the delay/amplification circuit 802 sets the amplitude of the pseudo signal (the calibration signal) on the basis of the amplitude when the detection optical system 20 detects the scattered light associated with the irradiation light radiated from the light source 11 of the irradiation optical system 10 as the detection light. In this way, the delay/amplification circuit 802 obtains the calibration signal without detecting the light for the calibration process (without performing a process of radiating and detecting the light for the calibration process) by generating a pseudo signal obtained by processing the phase and the amplitude of the modulated signal set in the light source 11. In detail, the delay/amplification circuit 802 has a delay circuit for changing the phase and an amplification circuit for changing the amplitude. As shown in FIG. 28, because the radiation of light for the calibration process or the like is not performed, the position of the optical head of the irradiation optical system 10 when the calibration process is performed is not particularly limited. Because a process after the calibration process (the second process) is similar to that of the first mode, description thereof will be omitted.

Figure 29:
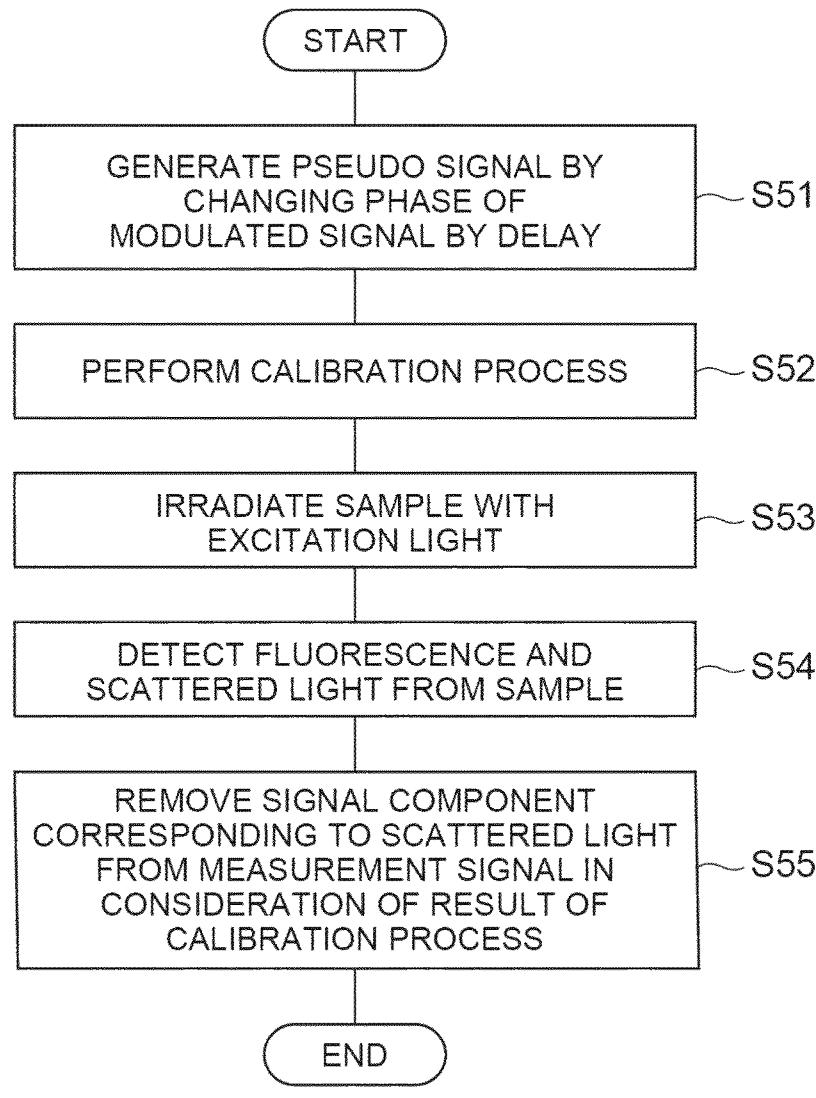
FIG. 29 is a flowchart showing a fluorescence measurement process of the third mode.

Next, a fluorescence measurement process of the third mode will be described with reference to FIG. 29. FIG. 29 is a flowchart showing the fluorescence measurement process of the third mode. As shown in FIG. 29, in the fluorescence measurement process of the third mode, initially, the delay/amplification circuit 802 generates a pseudo signal (a calibration signal) by changing a phase of a modulated signal by a delay corresponding to a period until the detection optical system 20 detects scattered light associated with irradiation light radiated from the light source 11 of the irradiation optical system 10 as detection light (step S51). Subsequently, in the cancel circuit 60, a calibration process for removing the signal component corresponding to the scattered light from the detection signal is performed on the basis of the pseudo signal (the calibration signal) (step S52). Because details of the calibration process are as described above with reference to FIGS. 10 to 13, and the like, description thereof will be omitted.

Subsequently, the optical head of the irradiation optical system 10 operates to scan the measurement region of the sample 500 and the measurement target portion 504 of the sample 500 is irradiated with excitation light (irradiation light) (step S53). The photodetection element 21 detects measurement target light including the fluorescence generated from the sample 500 irradiated with the excitation light and scattered light associated with the excitation light from the sample 500 irradiated with the excitation light (step S54). The cancel circuit 60 removes a signal component corresponding to the scattered light from the measurement signal corresponding to the above-described measurement target light in consideration of a result of performing the calibration process in step S52 (step S55). Specifically, as described above, the cancel circuit 60 removes the signal component corresponding to the scattered light from the measurement signal when the measurement signal and the switch signal whose phase has been adjusted in the calibration process are input.

Next, the operation and effects according to the third mode will be described.

The optical measurement device 801 (see FIG. 27) according to the third mode includes the irradiation optical system 10 configured to radiate irradiation light (excitation light) corresponding to a modulated signal; the detection optical system 20 configured to detect detection light caused by the irradiation light (the excitation light); and the delay/amplification circuit 802 and the cancel circuit 60 functioning as a signal processing unit. In the optical measurement device 801, in a first process, the delay/amplification circuit 802 designates scattered light associated with the irradiation light radiated from the irradiation optical system 10 as the detection light and generates a pseudo signal (a calibration signal) by changing a phase of the modulated signal in consideration of a delay corresponding to a period until the detection optical system 20 detects the detection light and the cancel circuit 60 performs a calibration process for removing a signal component corresponding to scattered light from the detection signal in a second process on the basis of the pseudo signal. Also, in the optical measurement device 801, in the second process, the irradiation optical system 10 irradiates the sample 500 with the excitation light (the irradiation light), the detection optical system 20 detects measurement target light as the detection light, wherein the measurement target light includes fluorescence generated from the sample 500 irradiated with the excitation light and light scattered from the sample 500 irradiated with the excitation light, and the cancel circuit 60 designates a measurement signal corresponding to the measurement target light as the detection signal and removes a signal component corresponding to the scattered light in the calibration process during the first process from the measurement signal.

In this way, in the optical measurement device 801, in the first process related to the calibration process, a pseudo signal (the calibration signal) obtained by changing the phase of the modulated signal input to the irradiation optical system 10 in accordance with the delay of the irradiation optical system 10 is generated. In this way, it is possible to obtain a calibration signal similar to that when the scattered light has been actually detected as the light for the calibration process (a calibration signal having a phase similar to that of the scattered light) without detecting the light for the calibration process by generating the calibration signal corresponding to the delay of the irradiation optical system 10 with respect to the modulated signal related to the irradiation light. That is, according to this configuration, it is possible to obtain a calibration signal of only the signal component of the scattered light that does not include the signal component of fluorescence. Thereby, in the second process, it is possible to remove a noise component caused by the irradiation light itself and perform fluorescence measurement with high accuracy by removing the signal component corresponding to the scattered light from the measurement signal appropriately on the basis of the result of performing the calibration process. Also, a problematic variation in a result of the calibration process corresponding to characteristics of the sample 500, for example, when the sample 500 is irradiated with irradiation light to detect the light for the calibration process, is limited because the light for the calibration process is detected without irradiating the sample 500 with the irradiation light. More specifically, the actual sample may have a variation in characteristics due to, for example, a difference between production lots, and, for example, a difference in the movement speed of the fluorescent substance or the like may occur. In this case, amounts of fluorescent substances (i.e., amounts of fluorescence emission) in region areas to be irradiated with the irradiation light during the calibration process are likely to be different from each other according to each actual sample. Thereby, the result of the calibration process may not be stable and, for example, sufficient reliability may not be obtained for determining the result of the optical measurement. However, the fluorescence measurement can be performed with higher accuracy by generating a calibration signal corresponding to the delay of the irradiation optical system 10 with respect to the modulated signal related to the irradiation light. Although it is difficult to set a threshold value for making the positive/negative determination in measurement using, for example, an immuno-chromatography method, when the result output by the device differs in accordance with a difference in the characteristics of each actual sample, it is also possible to limit such a problem when a calibration signal corresponding to the delay of the irradiation optical system 10 is generated with respect to the modulated signal related to the irradiation light. Also, for example, even if a plurality of samples 500 having different shapes (for example, a plurality of immuno-chromatography test piece reagent kits individually corresponding to various types of antigens) are measured by one optical measurement device 1, it is possible to simplify a control process on the hard side and a control process on the soft side because it is not necessary to set an appropriate calibration region for each sample 500 and the calibration signal corresponding to a delay of the irradiation optical system 10 is generated with respect to the modulated signal related to the irradiation light. Also, because the calibration signal is electrically generated without actually detecting the light for the calibration process, the detection optical system for the calibration process or the like becomes unnecessary, and a simple and inexpensive device configuration can be obtained. In this way, the optical measurement device 801 according to the present mode can perform the calibration process more appropriately, remove the noise component caused by the irradiation light itself more appropriately, and perform the fluorescence measurement with higher accuracy.

Further, in the above-described first process, the delay/amplification circuit 802 may set an amplitude of the calibration signal in consideration of an amplitude of a case in which the detection optical system 20 detects the scattered light associated with the irradiation light radiated from the irradiation optical system 10 as the detection light. Thereby, it is possible to obtain a calibration signal closer to that when the scattered light has been actually detected as the light for the calibration process.

For the calibration process as described above, it is preferable to perform the calibration process with the same irradiation light intensity each time such that high reproducibility is ensured in actual measurement. Thus, when the member (the reference member) described in the first mode or the like is used, it is preferable that the member can be mechanically and stably fixed. Also, preferably, the member does not easily change with time. Also, when the photodetection element is irradiated with the irradiation light for the calibration process as described in the second mode, it is preferable to perform a feedback process in a circuit such that a light intensity of the light source is uniformly kept. In the mode in which the calibration process is performed using a pseudo-created signal as in the third mode, a case in which the calibration can be performed with the same intensity of light each time is conceivable.

REFERENCE SIGNS LIST

1, 701, 801 Optical measurement device
10 Irradiation optical system
20 Detection optical system (photodetection unit, second detection optical system)
60 Cancel circuit (signal processing unit)
600 Reference member
600A Mirror
600B Reflection diffuser
610 Frosted glass
611 Mirror

720 Detection optical system (photodetection unit, first detection optical system)

802 Delay/amplification circuit (signal processing unit)

820 Detection optical system (first detection optical system and second detection optical system)

910 Irradiation optical system

The invention claimed is:

1. An optical measurement device for measuring optical characteristics of a measurement target object, the optical measurement device comprising:

an irradiation optical system configured to irradiate an irradiation target with irradiation light;

a photodetection unit configured to detect detection light caused by the irradiation light; and a signal processing unit configured to process a detection signal corresponding to the detection light, wherein, in a first process, the irradiation optical system designates a reference member for a calibration process different from the measurement target object as the irradiation target and irradiates the reference member with the irradiation light, the photodetection unit detects light for the calibration process as the detection light, the light for the calibration process including scattered light associated with the irradiation light from the reference member irradiated with the irradiation light, and the signal processing unit designates a calibration signal corresponding to the light for the calibration process as the detection signal and performs the calibration process for removing a signal component corresponding to the scattered light from the detection signal in a second process on the basis of the calibration signal, and wherein, in the second process, the irradiation optical system designates the measurement target object as the irradiation target and irradiates the measurement target object with the irradiation light, the photodetection unit detects measurement target light as the detection light, the measurement target light including fluorescence generated from the measurement target object irradiated with the irradiation light and light scattered from the measurement target object irradiated with the irradiation light, and the signal processing unit designates a measurement signal corresponding to the measurement target light as the detection signal and removes a signal component corresponding to the scattered light in the calibration process during the first process from the measurement signal.

2. The optical measurement device according to claim 1, wherein the reference member includes a reflection member configured to reflect the irradiation light.

3. The optical measurement device according to claim 2, wherein the reflection member prevents the fluorescence from being generated due to radiation of the irradiation light.

4. The optical measurement device according to claim 2, wherein the reflection member includes a reflection diffuser configured to diffuse the irradiation light.

5. The optical measurement device according to claim 2, wherein the reflection member includes:

a reflection base material configured to reflect the irradiation light; and a diffuser supported by the reflection base material and configured to diffuse the irradiation light.

6. The optical measurement device according to claim 2, wherein the reflection member includes a mirror.

7. An optical measurement method of measuring optical characteristics of a measurement target object, the optical measurement method comprising:

a first process including generating a calibration signal by changing a phase of a modulated signal input to an irradiation optical system in accordance with a delay corresponding to a period until a photodetection unit detects scattered light associated with irradiation light radiated from the irradiation optical system and performing a calibration process for removing a signal component corresponding to scattered light from a measurement signal on the basis of the calibration signal, and a second process including:

irradiating the measurement target object with the irradiation light;

detecting the measurement target light including fluorescence generated from the measurement target object irradiated with the irradiation light and light scattered from the measurement target object irradiated with the irradiation light; and removing a signal component corresponding to the scattered light in the calibration process during the first process from the measurement signal corresponding to the measurement target light.

* * * * *